US012094421B2

(12) United States Patent
Lim et al.

(10) Patent No.: US 12,094,421 B2
(45) Date of Patent: Sep. 17, 2024

(54) SCAN DRIVER INCLUDING A FIRST MASKING CONTROL UNIT AND DISPLAY DEVICE HAVING THE SAME

(71) Applicant: SAMSUNG DISPLAY CO., LTD., Yongin-si (KR)

(72) Inventors: Jaekeun Lim, Yongin-si (KR); Bon-Seog Gu, Yongin-si (KR); Taehoon Kim, Yongin-si (KR); Jinyoung Roh, Yongin-si (KR); Hae-Kwan Seo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/132,725

(22) Filed: Apr. 10, 2023

(65) Prior Publication Data

US 2023/0402013 A1 Dec. 14, 2023

(30) Foreign Application Priority Data

May 19, 2022 (KR) ........................ 10-2022-0061410

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0842* (2013.01); *G09G 2300/0861* (2013.01); *G09G 2310/0202* (2013.01); *G09G 2310/0286* (2013.01); *G09G 2310/08* (2013.01); *G09G 2320/02* (2013.01); *G09G 2330/021* (2013.01)

(58) Field of Classification Search
None
See application file for complete search history.

(56) References Cited

U.S. PATENT DOCUMENTS 11,410,610 B2 8/2022 Seo et al.
2016/0111055 A1* 4/2016 Na ........................ G09G 3/3666 345/94

(Continued)

FOREIGN PATENT DOCUMENTS

KR 1020190139355 A 12/2019
KR 20200055597 A * 5/2020

(Continued)

*Primary Examiner* — Kirk W Hermann
(74) *Attorney, Agent, or Firm* — CANTOR COLBURN LLP

(57) ABSTRACT

A scan driver includes a control unit, a first output unit, a second output unit, and a masking control unit. The control unit outputs a first control signal to a first control node and outputs a second control signal to a second control node. The first output unit is connected to the first control node, a first output terminal, and a first voltage terminal, and operates in response to the first control signal. The second output unit is connected to the second control node, the first output terminal, and a second voltage terminal, and operates in response to the second control signal. The masking control unit is connected between an input terminal, to which a clock signal is input, and the first control node and controls a voltage level of the first control signal in response to a masking enable signal.

18 Claims, 17 Drawing Sheets

(56) References Cited

U.S. PATENT DOCUMENTS

| | | | | |
|---|---|---|---|---|
| 2016/0217728 | A1* | 7/2016 | In | G09G 3/2096 |
| 2016/0351160 | A1* | 12/2016 | In | G09G 3/3225 |
| 2017/0124958 | A1* | 5/2017 | Pyo | G09G 3/3258 |
| 2019/0378458 | A1 | 12/2019 | Lee et al. | |
| 2021/0035489 | A1* | 2/2021 | Seo | G09G 3/22 |
| 2021/0384467 | A1 | 12/2021 | Park et al. | |
| 2021/0407431 | A1 | 12/2021 | Kim et al. | |

FOREIGN PATENT DOCUMENTS

| | | | |
|---|---|---|---|
| KR | 1020210152102 | A | 12/2021 |
| KR | 1020220000022 | A | 1/2022 |
| KR | 1020220001037 | A | 1/2022 |

* cited by examiner

<NFM>

<NFM>

<MFM>

SCAN DRIVER INCLUDING A FIRST MASKING CONTROL UNIT AND DISPLAY DEVICE HAVING THE SAME

This application claims priority to Korean Patent Application No. 10-2022-0061410, filed on May 19, 2022, and all the benefits accruing therefrom under 35 U.S.C. § 119, the content of which in its entirety is herein incorporated by reference.

BACKGROUND

1. Field

Embodiments of the disclosure described herein relate to a scan driver and a display device including the scan driver, and more particularly, relate to a scan driver capable of reducing power consumption and a display device including the scan driver.

2. Description of the Related Art

A light emitting display device among display devices displays an image by using a light emitting diode that generates light through the recombination of electrons and holes. The light emitting display device has a fast response speed and is driven with low power consumption.

The display device typically includes a display panel for displaying an image, a scan driver for sequentially supplying scan signals to scan lines included in the display panel, and a data driver for supplying data signals to data lines included in the display panel.

SUMMARY

Embodiments of the disclosure provide a scan driver capable of reducing power consumption and a display device including the scan driver.

According to an embodiment, a scan driver includes a control unit, a first output unit, a second output unit, and a first masking control unit. In such an embodiment, the control unit outputs a first control signal to a first control node and outputs a second control signal to a second control node, in response to clock signals and a carry signal. In such an embodiment, the first output unit is connected to the first control node, a first output terminal, and a first voltage terminal to which a first voltage is supplied, and operates in response to the first control signal. In such an embodiment, the second output unit is connected to the second control node, the first output terminal, and a second voltage terminal to which a second voltage is supplied, and operates in response to the second control signal. In such an embodiment, the first masking control unit is connected between an input terminal, to which one clock signal of the clock signals is input, and the first control node and controls a voltage level of the first control signal in response to a first masking enable signal.

According to an embodiment, a display device includes a display panel including a plurality of pixels connected to a plurality of data lines and a plurality of first scan lines, a data driver which outputs data signals to the plurality of data lines, a scan driver which outputs first scan signals to the plurality of first scan lines, and a driving controller which controls the data driver and the scan driver.

In such an embodiment, the scan driver includes a plurality of driving stages that output the first scan signals, respectively. In such an embodiment, each of the plurality of driving stages includes a control unit, a first output unit, a second output unit, and a first masking control unit. In such an embodiment, the control unit outputs a first control signal to a first control node and outputs a second control signal to a second control node, in response to clock signals and a carry signal. In such an embodiment, the first output unit is connected to the first control node, a first output terminal connected to one of the plurality of first scan lines, and a first voltage terminal to which a first voltage is supplied, and operates in response to the first control signal. In such an embodiment, the second output unit is connected to the second control node, the first output terminal, and a second voltage terminal to which a second voltage is supplied, and operates in response to the second control signal. In such an embodiment, the first masking control unit is connected between an input terminal, to which one clock signal of the clock signals is input, and the first control node and controls a voltage level of the first control signal in response to a first masking enable signal.

BRIEF DESCRIPTION OF THE DRAWINGS

The above and other features of embodiments of the disclosure will become apparent by describing in detail embodiments thereof with reference to the accompanying drawings.

DETAILED DESCRIPTION

Figure 1A:
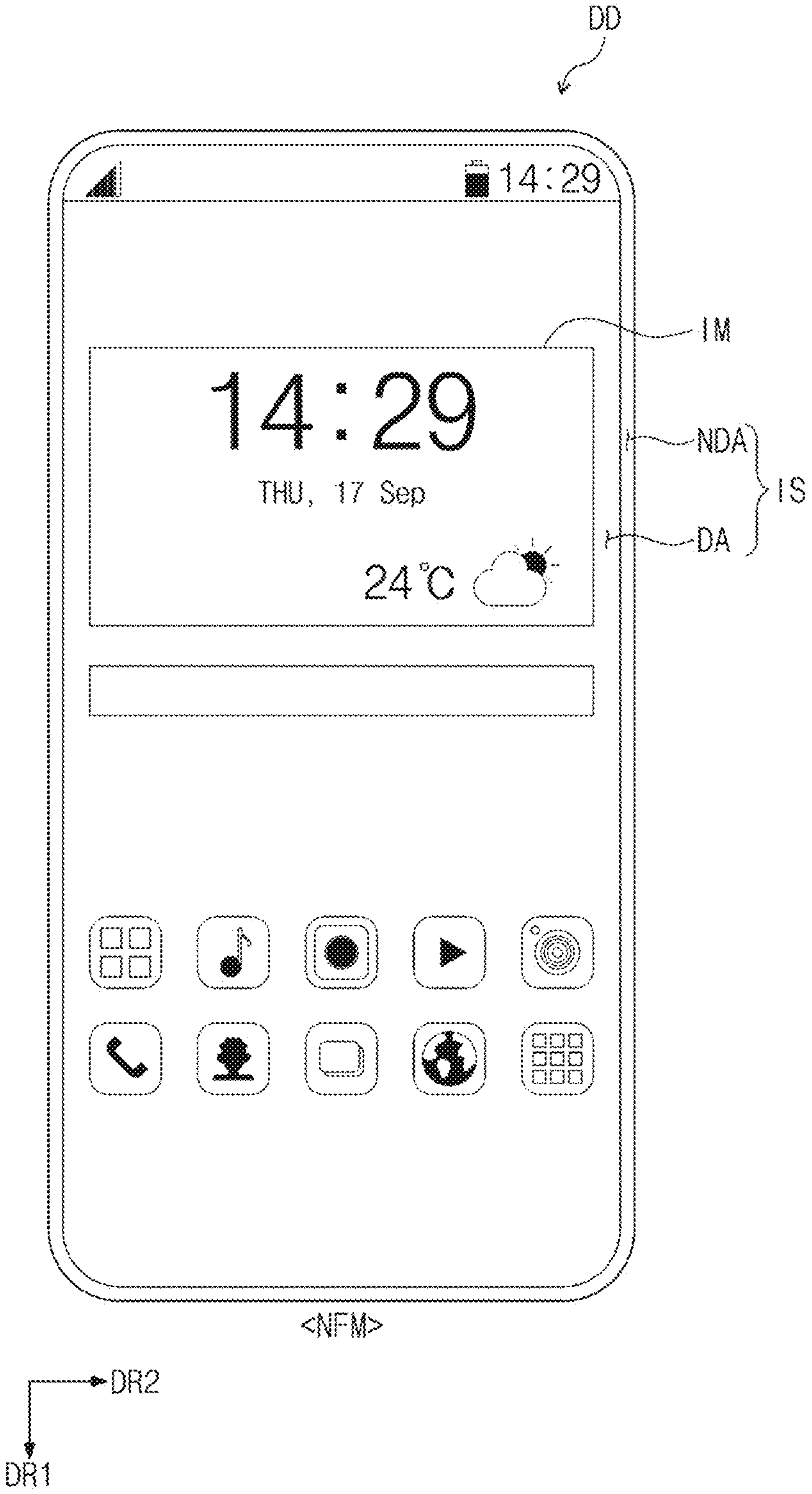
FIG. 1A is a plan view illustrating a screen of a display device operating in a normal frequency mode, according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to the accompanying drawings.

Figure 1B:
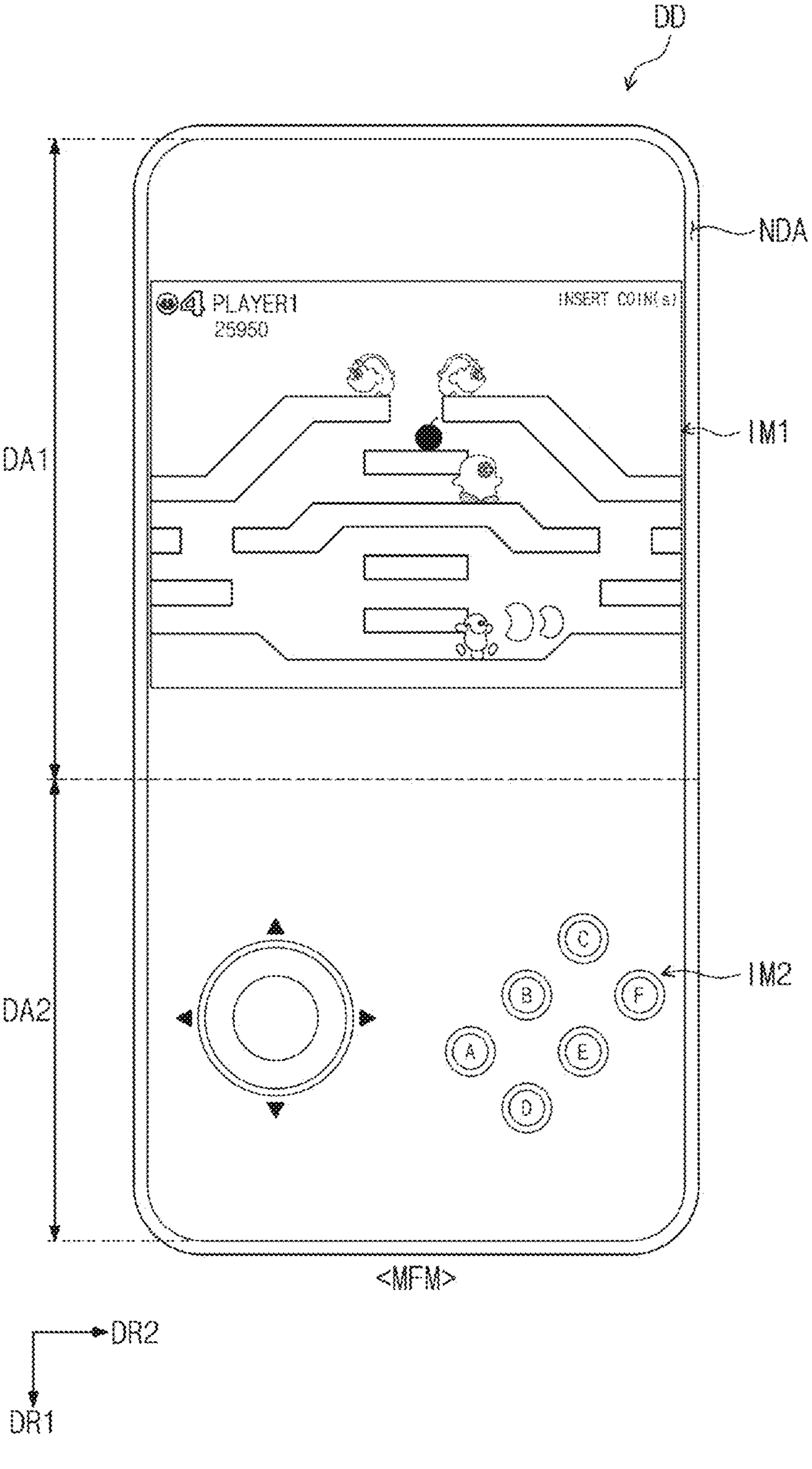
FIG. 1B is a plan view illustrating a screen of a display device operating in a multi-frequency mode, according to an embodiment of the disclosure.
Figure 2A:
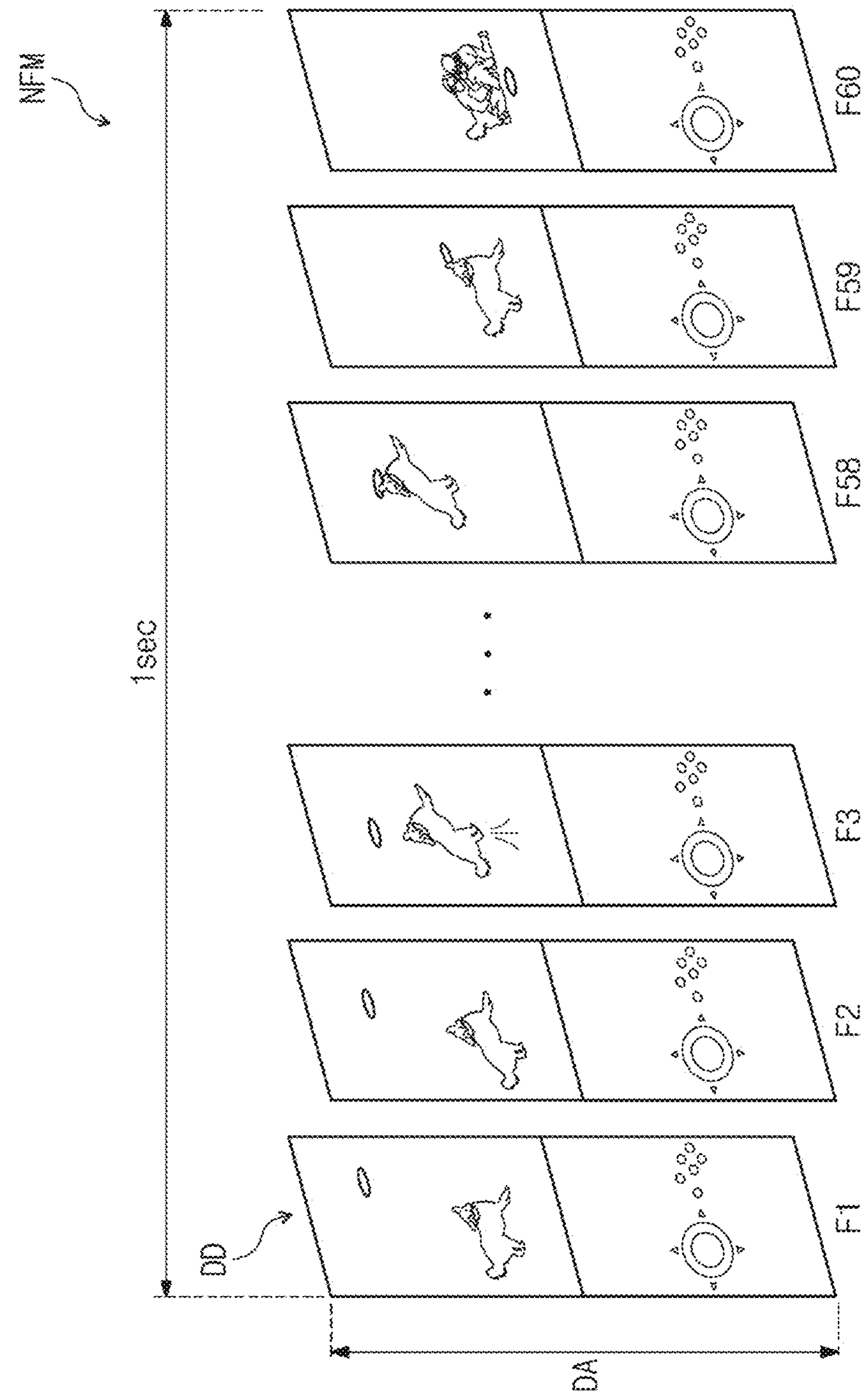
FIG. 2A is a diagram for describing an operation of a display device in a normal frequency mode, according to an embodiment of the disclosure.
Figure 2B:
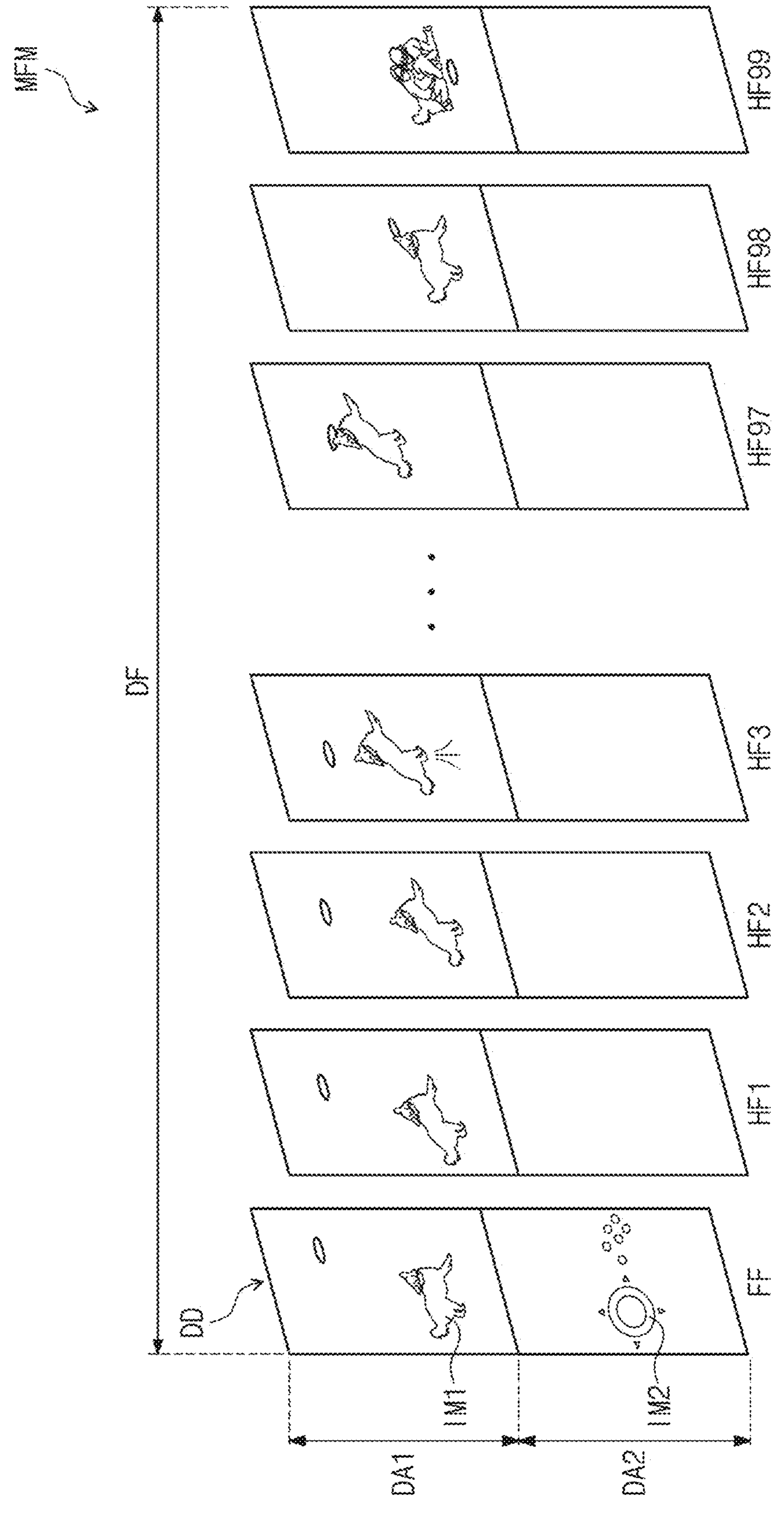
FIG. 2B is a diagram for describing an operation of a display device in a multi-frequency mode, according to an embodiment of the disclosure.

FIG. 1A is a plan view illustrating a screen of a display device operating in a normal frequency mode, according to an embodiment of the disclosure. FIG. 1B is a plan view illustrating a screen of a display device operating in a multi-frequency mode, according to an embodiment of the disclosure. FIG. 2A is a diagram for describing an operation of a display device in a normal frequency mode, according to an embodiment of the disclosure. FIG. 2B is a diagram for describing an operation of a display device in a multi-frequency mode, according to an embodiment of the disclosure.

Referring to FIGS. 1A and 1B, an embodiment of a display device DD may be a device activated depending on an electrical signal. The display device DD may be applied to an electronic device such as a smart watch, a tablet personal computer (PC), a notebook computer, a computer, a smart television, or the like.

The display device DD may display an image IM on a display surface IS parallel to each of a first direction DR1 and a second direction DR2. The display surface IS on which the image IM is displayed may correspond to a front surface of the display device DD. The image IM may include a still image as well as a moving image.

The display surface IS of the display device DD may be divided into a display area DA and a non-display area NDA. The display area DA may be an area in which the image IM is displayed. A user perceives (or views) the image IM through the display area DA. In an embodiment, as shown in FIG. 1A, the display area DA may be in the shape of a quadrangle whose vertexes are rounded. However, this is illustrated as an example. The display area DA may have one of other various shapes, and not being limited to that of an embodiment.

The non-display area NDA is adjacent to the display area DA. The non-display area NDA may have a given or predetermined color. The non-display area NDA may surround the display area DA. Accordingly, a shape of the display area DA may be defined substantially by the non-display area NDA. However, this is illustrated as an example. Alternatively, the non-display area NDA may be disposed adjacent to only one side of the display area DA or may be omitted. The non-display area NDA of the display device DD may be variously modified and is not being limited to that of an embodiment.

Referring to FIGS. 1A, 1B, 2A, and 2B, an embodiment of the display device DD may display an image in a normal frequency mode NFM or a multi-frequency mode MFM. In the normal frequency mode NFM, the display area DA of the display device DD is not divided into a plurality of display areas having different operating frequencies from each other. That is, in the normal frequency mode NFM, an entire portion of the display area DA may operate at one operating frequency, and the operating frequency of the display area DA in the normal frequency mode NFM may be defined as a normal frequency. In an embodiment, for example, the normal frequency may be 60 hertz (Hz). In the normal frequency mode NFM, 60 images corresponding to the first to 60th frames F1 to F60 may be displayed in the display area DA of the display device DD for 1 second (1 sec).

In the multi-frequency mode MFM, the display area DA of the display device DD is divided into a plurality of display areas having different operating frequencies from each other. According to an embodiment of the disclosure, the display area DA in the multi-frequency mode MFM may include a first display area DA1 and a second display area DA2. The first and second display areas DA1 and DA2 are disposed adjacent to each other in the first direction DR1. The operating frequency of the first display area DA1 may be a frequency higher than or equal to the normal frequency, and the operating frequency of the second display area DA2 may be a frequency lower than the normal frequency. In an embodiment, for example, where the normal frequency is 60 Hz, the operating frequency of the first display area DA1 may be 60 Hz, 80 Hz, 90 Hz, 100 Hz, 120 Hz, or the like, and the operating frequency of the second display area DA2 may be 1 Hz, 20 Hz, 30 Hz, 40 Hz, or the like.

According to an embodiment of the disclosure, the first display area DA1 may be an area in which a video or a moving image (hereinafter referred to as a "first image IM1"), for which high-speed driving is desired, is displayed. The second display area DA2 may be an area in which a still image (hereinafter referred to as a "second image IM2"), for which high-speed driving is not desired, or a text image having a long change period is displayed. Accordingly, when the still image and the video are simultaneously displayed in the screen of the display device DD, it is possible to improve the display quality of the video and to reduce power consumption while the display device DD operates in the multi-frequency mode MFM.

Referring to FIG. 2B, in the multi-frequency mode MFM, an image may be displayed in the display area DA of the display device DD during a plurality of driving frames. Each of the driving frames may include a full frame FF in which the first display area DA1 and the second display area DA2 are driven, and partial frames in each of which only the first display area DA1 is driven. Each of the partial frames may have duration shorter than or equal to a duration of the full frame. The numbers of the partial frames included in each driving frame may be the same as or different from one another. Each driving frame may be defined as a section until the next full frame is started after the current full frame is started.

In an embodiment of the disclosure, during each driving frame DF, the first display area DA1 may operate at 100 Hz, and the second display area DA2 may operate at 1 Hz. In such an embodiment, each driving frame DF may have a duration corresponding to 1 second (1 sec) and may include one full frame FF and 99 partial frames HF1 to HF99. In each driving frame DF, the 100 first images IM1 including the full frame FF and the 99 partial frames HF1 to HF99, that is, the 100 images IM1 may be displayed in the first display area DA1 of the display device DD, and one second image IM2 corresponding to the full frame FF may be displayed in the second display area DA2.

For convenience of description, FIG. 2B illustrates an embodiment where, in the multi-frequency mode MFM, the first operating frequency of the first display area DA1 is 100 Hz and the second operating frequency of the second display area DA2 is 1 Hz, but the disclosure is not limited thereto. In an alternative embodiment, for example, the first operating frequency of the first display area DA1 may be 100 Hz, and the second operating frequency of the second display area DA2 may be 20 Hz. In such an embodiment, in each driving frame DF, the first images IM1 including one full frame FF and 4 partial frames, that is, the 5 images IM1 may be displayed in the first display area DA1 of the display device DD, and the one second image IM2 corresponding to the full frame FF may be displayed in the second display area DA2. In another alternative embodiment, the first operating frequency of the first display area DA1 may be 90 Hz, and the second operating frequency of the second display area DA2 may be 30 Hz. In such an embodiment, in each driving frame DF, the first images IM1 including one full frame FF and 2 partial frames, that is, the 3 images IM1 may be displayed in the first display area DA1 of the display device DD, and the one second image IM2 corresponding to the full frame FF may be displayed in the second display area DA2.

Figure 3:
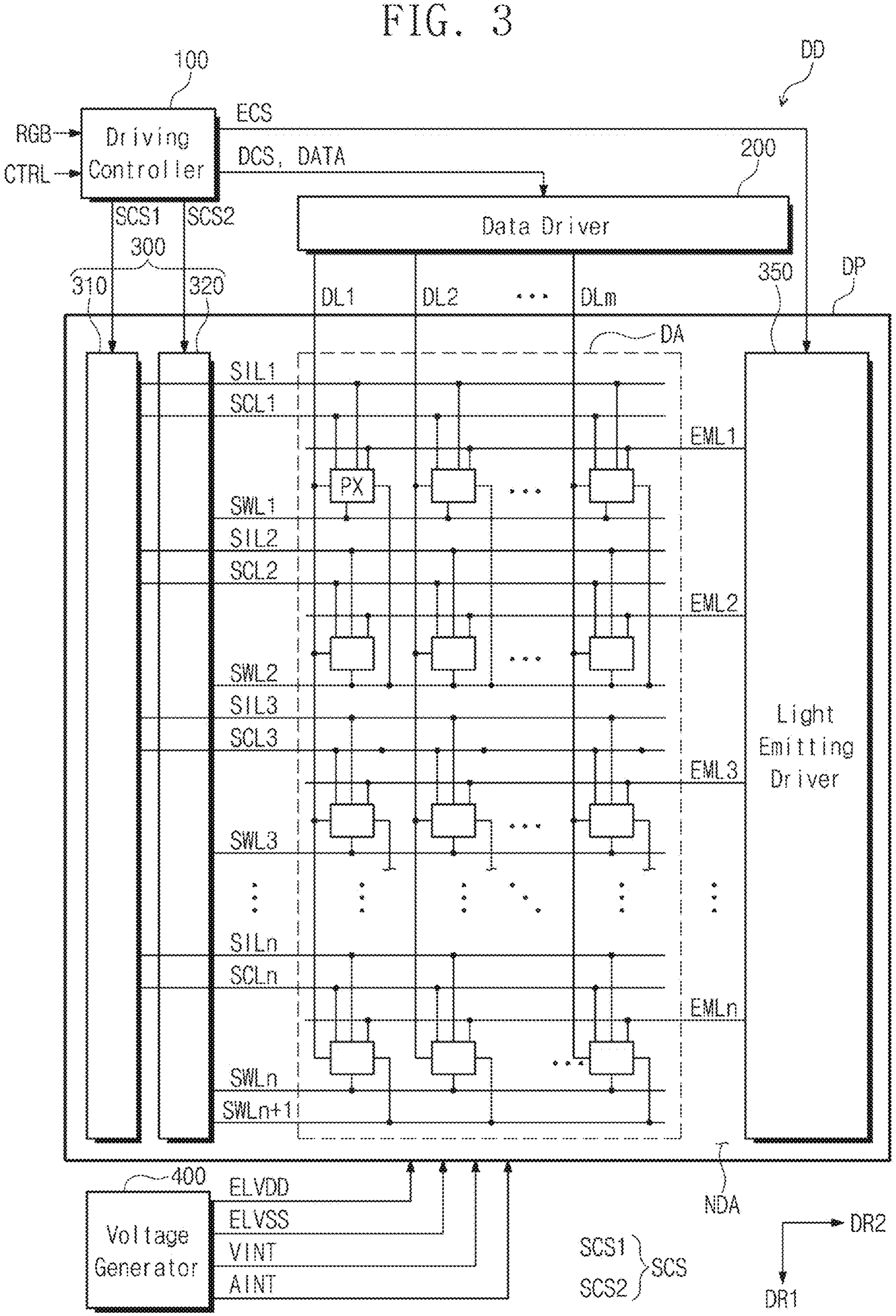
FIG. 3 is a block diagram of a display device according to an embodiment of the disclosure.

FIG. 3 is a block diagram of a display device, according to an embodiment of the disclosure.

Referring to FIG. 3, an embodiment of the display device DD includes a display panel DP, a panel driver, and a driving controller 100. According to an embodiment of the disclosure, the panel driver includes a data driver 200, a scan driver 300, a light emitting driver 350, and a voltage generator 400.

The driving controller 100 receives an image signal RGB and a control signal CTRL. The driving controller 100 generates image data DATA by converting a data format of the image signal RGB in compliance with the specification for an interface with the data driver 200. The driving controller 100 outputs a scan control signal SCS, a data control signal DCS, and a driving control signal ECS.

The data driver 200 receives the data control signal DCS and the image data DATA from the driving controller 100. The data driver 200 converts the image data DATA into data signals and outputs the data signals to a plurality of data lines DL1 to DLm to be described later. The data signals refer to analog voltages corresponding to grayscale values of the image data DATA.

In an embodiment of the disclosure, the scan driver 300 includes a first scan driver 310 and a second scan driver 320. The scan control signal SCS includes a first scan control signal SCS1 received by the first scan driver 310 from the driving controller 100, and a second scan control signal SCS2 received by the second scan driver 320 from the driving controller 100. The first and second scan drivers 310 and 320 may output scan signals to scan lines in response to the first and second scan control signals SCS1 and SCS2, respectively. FIG. 3 illustrates an embodiment in which the display device DD includes the two scan drivers 310 and 320, but the number of the scan drivers is not limited thereto.

The voltage generator 400 generates voltages used to operate the display panel DP. In an embodiment, the voltage generator 400 generates a first driving voltage ELVDD, a second driving voltage ELVSS, a first initialization voltage VINT, and a second initialization voltage AINT.

The display panel DP includes initialization scan lines SIL1 to SILn, compensation scan lines SCL1 to SCLn, write scan lines SWL1 to SWLn+1, emission control lines EML1 to EMLn, data lines DL1 to DLm, and pixels PX. The initialization scan lines SILL to SILn, the compensation scan lines SCL1 to SCLn, the write scan lines SWL1 to SWLn+1, the emission control lines EML1 to EMLn, the data lines DL1 to DLm, and the pixels PX may overlap the display area DA. The initialization scan lines SILL to SILn, the compensation scan lines SCL1 to SCLn, the write scan lines SWL1 to SWLn+1, and the emission control lines EML1 to EMLn extend in the second direction DR2. The initialization scan lines SIL1 to SILn, the compensation scan lines SCL1 to SCLn, the write scan lines SWL1 to SWLn+1, and the emission control lines EML1 to EMLn are arranged spaced from one another in the first direction DR1. The data lines DL1 to DLm extend in the first direction DR1 and are arranged spaced from one another in the second direction DR2. Here, each of 'n' and 'm' is an integer greater than or equal to 1.

A plurality of pixels PX are electrically connected to the initialization scan lines SIL1 to SILn, the compensation scan lines SCL1 to SCLn, the write scan lines SWL1 to SWLn+1, the emission control lines EML1 to EMLn, and the data lines DL1 to DLm. Each of the plurality of pixels PX may be electrically connected to three scan lines. In an embodiment, for example, as illustrated in FIG. 3, the first row of pixels may be connected to the first initialization scan line SIL1, the first compensation scan line SCL1, and the first write scan line SWL1. In such an embodiment, the second row of pixels may be connected to the second initialization scan line SIL2, the second compensation scan line SCL2, and the second write scan line SWL2.

The first scan driver 310 may output initialization scan signals to the initialization scan lines SIL1 to SILn and may output compensation scan signals (or scan signals) to the compensation scan lines SCL1 to SCLn, in response to the first scan control signal SCS1. The second scan driver 320 may output write scan signals to the write scan lines SWL1 to SWLn+1 in response to the second scan control signal SCS2.

The light emitting driver 350 receives the driving control signal ECS from the driving controller 100. The light emitting driver 350 may output emission control signals to the emission control lines EML1 to EMLn in response to the driving control signal ECS.

Each of the plurality of pixels PX includes a light emitting diode ED (see FIG. 4) and a pixel circuit unit PXC (see FIG. 4) for controlling the emission of the light emitting diode ED. The pixel circuit unit PXC may include a plurality of transistors and a capacitor. The scan driver 300 may include transistors formed through a same process as the pixel circuit unit PXC.

Each of the plurality of pixels PX receives the first driving voltage ELVDD, the second driving voltage ELVSS, the first initialization voltage VINT, and the second initialization voltage AINT from the voltage generator 400.

Figure 4:
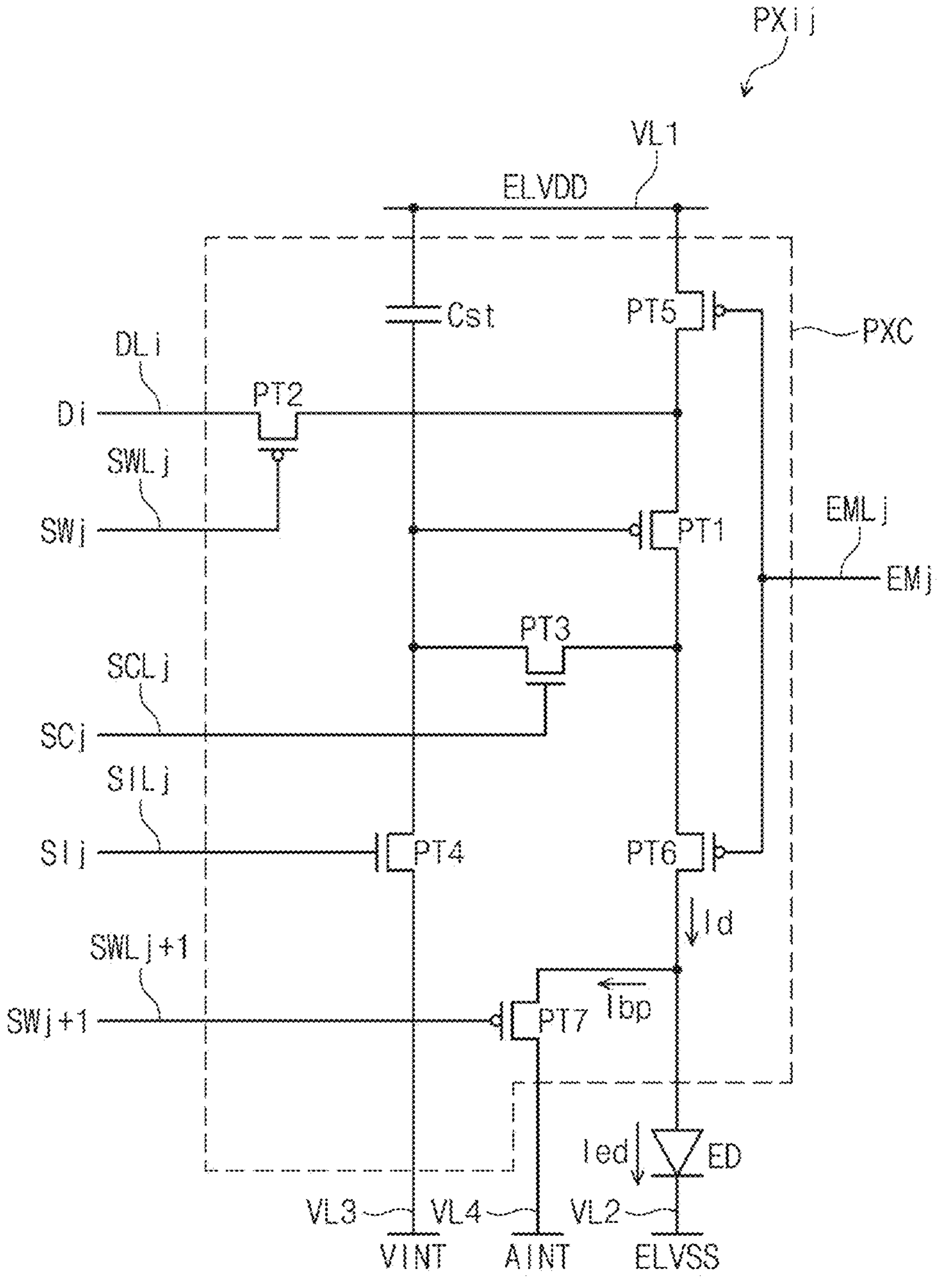
FIG. 4 is a circuit diagram of a pixel, according to an embodiment of the disclosure.
Figure 5:
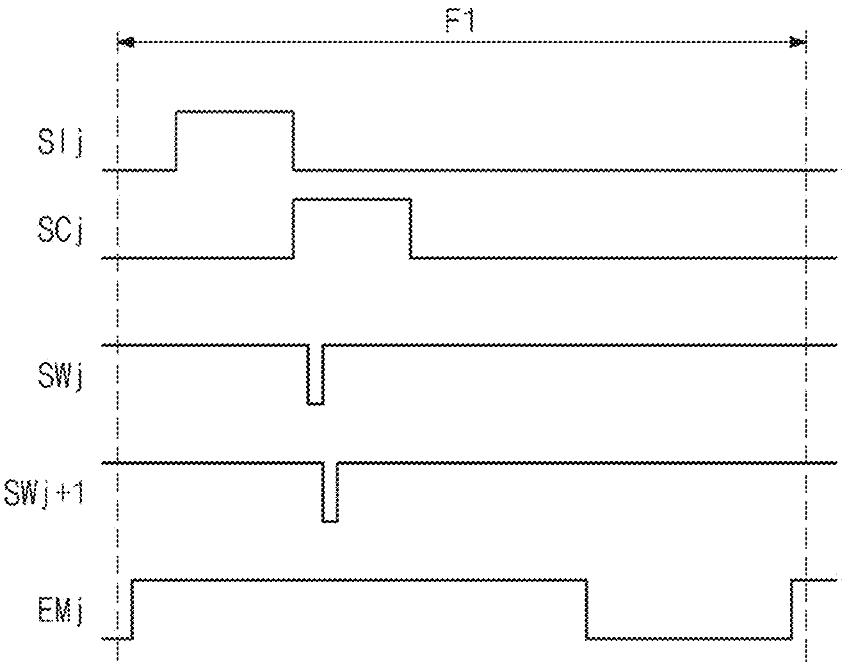
FIG. 5 is a waveform diagram for describing an operation of the pixel illustrated in FIG. 4.

FIG. 4 is a circuit diagram of a pixel, according to an embodiment of the disclosure. FIG. 5 is a waveform diagram for describing an operation of the pixel illustrated in FIG. 4.

FIG. 4 illustrates an equivalent circuit diagram of one pixel PXij among the pixels PX illustrated in FIG. 3. Hereinafter, a circuit structure of the pixel PXij will be described in detail. The plurality of pixels PX have a same structure as each other, and thus, any repetitive detailed description of the remaining pixels will be omitted to avoid redundancy. The pixel PXij is connected to the i-th data line DLi (hereinafter referred to as a "data line") of the data lines DL1 to DLm and the j-th emission control line EMLj (hereinafter referred to as an "emission control line") among the emission control lines EML1 to EMLn. The pixel PXij is connected to the j-th initialization scan line SILj (hereinafter, referred to as an "initialization scan line") among the initialization scan lines SIL1 to SILn, the j-th write scan line SWLj (hereinafter, referred to as a "first write scan line") and the (j+1)-th write scan line SWLj+1 (hereinafter, referred to as a "second write scan line") among the write scan lines SWL1 to SWLn+1. In such an embodiment, the pixel PXij is connected to the j-th compensation scan line SCLj (hereinafter, referred to as a "compensation scan line") among the compensation scan lines SCL1 to SCLn. Alternatively, the pixel PXij may be connected to a separate j-th black scan line instead of the (j+1)-th write scan line SWLj+1. Here, 'j' is an integer less than or equal to n, and 'i' is an integer less than or equal to m.

The pixel PXij includes the light emitting element ED and the pixel circuit unit PXC. The light emitting element ED may include a light emitting diode. The light emitting diode may include an organic light emitting material, an inorganic light emitting material, quantum dots, or quantum rods as a light emitting layer.

The pixel circuit unit PXC includes first to seventh transistors PT1, PT2, PT3, PT4, PT5, PT6, and PT7 and a single capacitor Cst. Each of the first to seventh transistors PT1 to PT7 may be a transistor having a low-temperature polycrystalline silicon (LTPS) semiconductor layer. Some of the first to seventh transistors PT1 to PT7 may be P-type transistors and the other(s) thereof may be N-type transistors. In an embodiment, for example, among the first to seventh transistors PT1 to PT7, the first, second, and fifth to seventh transistors PT1, PT2, and PT5 to PT7 are P-type transistors, and the third and fourth transistors PT3 and PT4 may be N-type transistors by using an oxide semiconductor as a semiconductor layer. However, a configuration of the pixel circuit unit PXC according to the disclosure is not limited to an embodiment illustrated in FIG. 4. The pixel circuit unit PXC illustrated in FIG. 4 is only an example. In an embodiment, for example, the configuration of the pixel circuit unit PXC may be modified and implemented. In an embodiment, for example, all of the first to seventh transistors PT1 to PT7 may be P-type transistors or N-type transistors.

The initialization scan line SILj may deliver the j-th initialization scan signal SIj (hereinafter referred to as an "initialization scan signal") to the pixel PXij; the compensation scan line SCLj may deliver the j-th compensation scan signal SCj (hereinafter referred to as a "compensation scan signal") to the pixel PXij; the first and second write scan lines SWLj and SWLj+1 may deliver the j-th and (j+1)-th write scan signals SWj and SWj+1 (hereinafter referred to as "first and second write scan signals") to the pixel PXij; and, the emission control line EMLj may deliver the j-th emission control signal EMj (hereinafter referred to as an "emission control signal") to the pixel PXij. The data line DLi delivers a data signal Di to the pixel PXij. The data signal Di may have a voltage level corresponding to the grayscale of the corresponding image signal among the image signal RGB entered into the display device DD (see FIG. 3). First to fourth driving voltage lines VL1, VL2, VL3, and VL4 may deliver the first driving voltage ELVDD, the second driving voltage ELVSS, the first initialization voltage VINT, and the second initialization voltage AINT to the pixel PXij, respectively.

The first transistor PT1 includes a first electrode connected with the first driving voltage line VL1 through the fifth transistor PT5, a second electrode electrically connected with an anode of the light emitting element ED through the sixth transistor PT6, and a gate electrode connected with one end of the capacitor Cst. The first transistor PT1 may receive the data signal Di delivered through the data line DLi based on the switching operation of the second transistor PT2 and then may supply a driving current Id to the light emitting element ED.

The second transistor PT2 includes a first electrode connected to the data line DLi, a second electrode connected to the first electrode of the first transistor PT1, and a gate electrode connected to the first write scan line SWLj. The second transistor PT2 may be turned on in response to the first write scan signal SWj received through the first write scan line SWLj and then may deliver the data signal Di delivered from the data line DLi to the first electrode of the first transistor PT1.

The third transistor PT3 includes a first electrode connected to the second electrode of the first transistor PT1, a second electrode connected to the gate electrode of the first transistor PT1, and a gate electrode connected to the compensation scan line SCLj. The third transistor PT3 may be turned on in response to the compensation scan signal SCj received through the compensation scan line SCLj, and thus, the gate electrode and the second electrode of the first transistor PT1 may be connected, that is, the first transistor PT1 may be diode-connected.

The fourth transistor PT4 includes a first electrode connected to the gate electrode of the first transistor PT1, a second electrode connected to the third voltage line VL3 through which the first initialization voltage VINT is delivered, and a gate electrode connected to the initialization scan line SILj. The fourth transistor PT4 may be turned on in response to the initialization scan signal SIj delivered through the initialization scan line SILj such that the first initialization voltage VINT is delivered to the gate electrode of the first transistor PT1. As such, a voltage of the gate electrode of the first transistor PT1 may be initialized. This operation may be referred to as an "an initialization operation".

The fifth transistor PT5 includes a first electrode connected to the first driving voltage line VL1, a second electrode connected to the first electrode of the first transistor PT1, and a gate electrode connected to the emission control line EMLj.

The sixth transistor PT6 includes a first electrode connected to the second electrode of the first transistor PT1, a second electrode connected to the anode of the light emitting element ED, and a gate electrode connected to the emission control line EMLj.

The fifth transistor PT5 and the sixth transistor PT6 are simultaneously turned on in response to the emission control signal EMj received through the emission control line EMLj. The first driving voltage ELVDD applied through the fifth transistor PT5 thus turned on may be compensated through the diode-connected first transistor PT1 and then may be delivered to the light emitting element ED.

The seventh transistor PT7 includes a first electrode connected to the second electrode of the sixth transistor PT6, a second electrode connected to the fourth driving voltage line VL4, through which the second initialization voltage AINT is delivered, and a gate electrode connected to the second write scan line SWLj+1.

In an embodiment, as described above, one end of the capacitor Cst is connected to the gate electrode of the first transistor PT1, and the other end of the capacitor Cst is connected to the first driving voltage line VL1. The cathode of the light emitting element ED may be connected to the second driving voltage line VL2, through which the second driving voltage ELVSS is delivered.

Referring to FIGS. 4 and 5, when the initialization scan signal SIj having a high level is provided through the initialization scan line SILj during the initialization period of one frame F1, the fourth transistor PT4 is turned on in response to the initialization scan signal SIj having the high level. The first initialization voltage VINT is delivered to the gate electrode of the first transistor PT1 through the turned-on fourth transistor PT4, and the gate electrode of the first transistor PT1 is initialized by the first initialization voltage VINT.

Next, when the compensation scan signal SCj having a high level is supplied through the compensation scan line SCLj during the initialization period of one frame F1, the third transistor PT3 is turned on. A compensation period may not overlap an initialization section. The activation section of the compensation scan signal SCj is defined as a section in which the compensation scan signal SCj has a high level. The activation section of the initialization scan signal SIj is defined as a section in which the initialization scan signal SIj has a high level. The activation section of the compensation scan signal SCj may not overlap the activation section of the initialization scan signal SIj. The activation section of the initialization scan signal SIj may precede the activation section of the compensation scan signal SCj.

During the compensation period, the first transistor PT1 is diode-connected by the third transistor PT3 turned on and is forward-biased. Moreover, the compensation interval may include a data write section in which the first write scan signal SWj is generated to have a low level. During the data write section, the second transistor PT2 is turned on by the first write scan signal SWj having the low level. Then, a compensation voltage (Di-Vth) obtained by reducing the voltage of the data signal Di supplied from the data line DLi by the threshold voltage (Vth) of the first transistor PT1 is applied to the gate electrode of the first transistor PT1. That is, the potential of the gate electrode of the first transistor PT1 may be the compensation voltage (Di-Vth).

The first driving voltage ELVDD and the compensation voltage (Di-Vth) may be respectively applied to opposite ends of the capacitor Cst, and charges corresponding to a voltage difference between the opposite ends of the capacitor Cst may be stored in the capacitor Cst.

Then, the seventh transistor PT7 is turned on by receiving the second write scan signal SWj+1 having the low level through the second write scan line SWLj+1. A portion of the driving current Id may be drained through the seventh transistor PT7 as a bypass current Ibp.

In a case where the pixel PXij displays a black image, if the light emitting element ED emits light even though the minimum driving current of the first transistor PT1 flows as the driving current Id, the pixel PXij may not normally display a black image. Accordingly, in an embodiment, the seventh transistor PT7 in the pixel PXij may drain (or disperse) a part of the minimum driving current of the first transistor PT1 to a current path, which is different from a current path to the light emitting element ED, as the bypass current Ibp. Here, the minimum driving current of the first transistor PT1 means the current flowing into the first transistor PT1 under the condition that the first transistor PT1 is turned off because the gate-source voltage (Vgs) of the first transistor PT1 is less than the threshold voltage (Vth). As the minimum driving current (e.g., a current of 10 pA or less) flowing to the first transistor PT1 is transferred to the light emitting element ED under the condition that the first transistor PT1 is turned off, an image of a black grayscale is displayed. When the pixel PXij displays a black image, the bypass current Ibp has a relatively large influence on the minimum driving current. On the other hand, when the pixel PXij displays an image such as a normal image or a white image, the bypass current Ibp has little effect on the driving current Id. Accordingly, when a black image is displayed, a current (i.e., the light emitting current led) that corresponds to a result of subtracting the bypass current Ibp flowing through the seventh transistor PT7 from the driving current Id is provided to the light emitting element ED, and thus a black image may be clearly displayed. Accordingly, the pixel PXij may implement an accurate black grayscale image by using the seventh transistor PT7, and thus a contrast ratio may be improved.

Next, the emission control signal EMj supplied from the emission control line EMLj is changed from a high level to a low level. The fifth transistor PT5 and the sixth transistor PT6 are turned on in response to the emission control signal EMj having the low level. In this case, the driving current Id corresponding to a voltage difference between the gate voltage of the gate electrode of the first transistor PT1 and the first driving voltage ELVDD is generated and supplied to the light emitting element ED through the sixth transistor PT6, and the current led flows through the light emitting element ED.

Figure 6A:
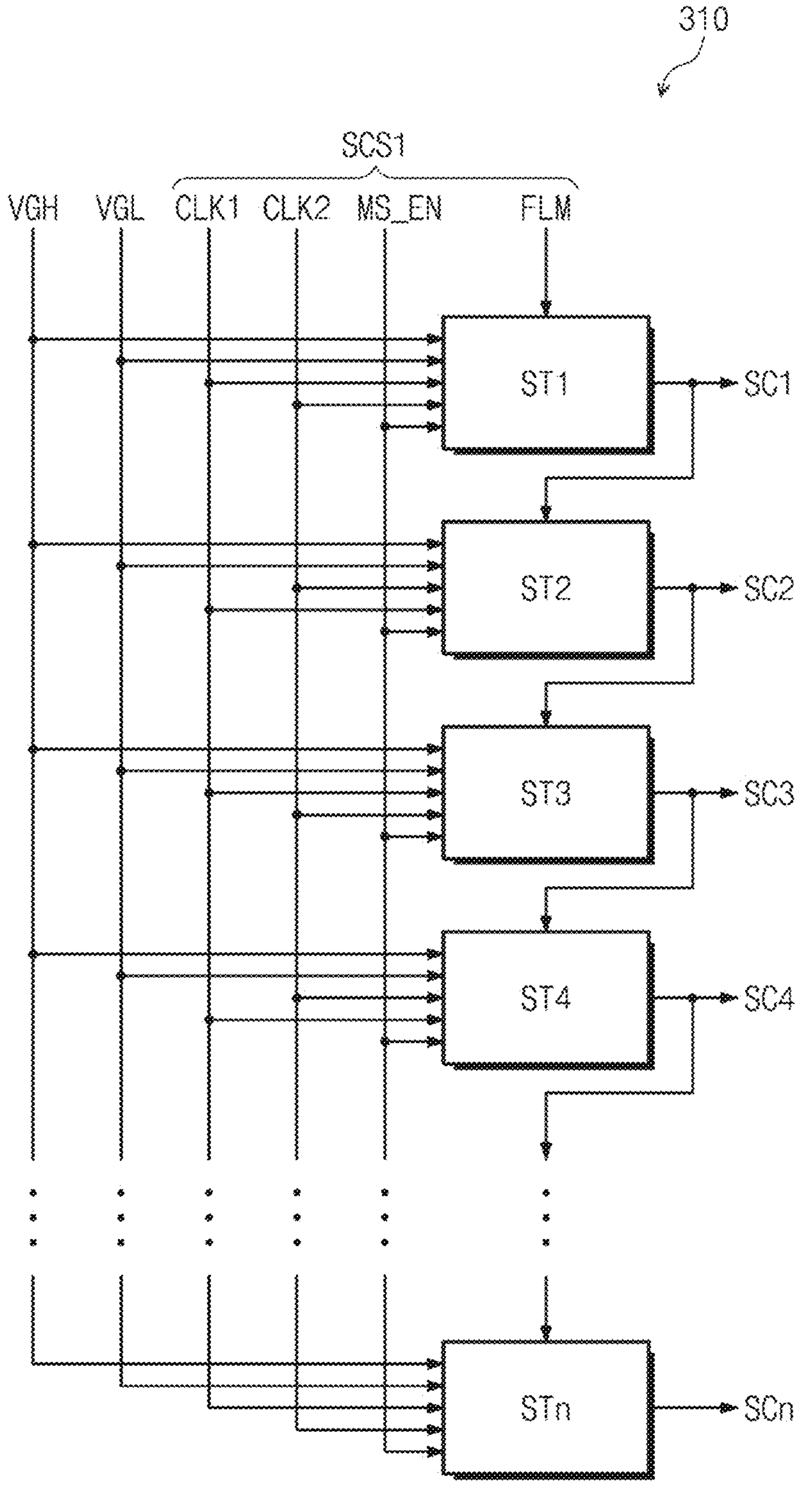
FIG. 6A is a block diagram of a first scan driver, according to an embodiment of the disclosure.
Figure 6B:
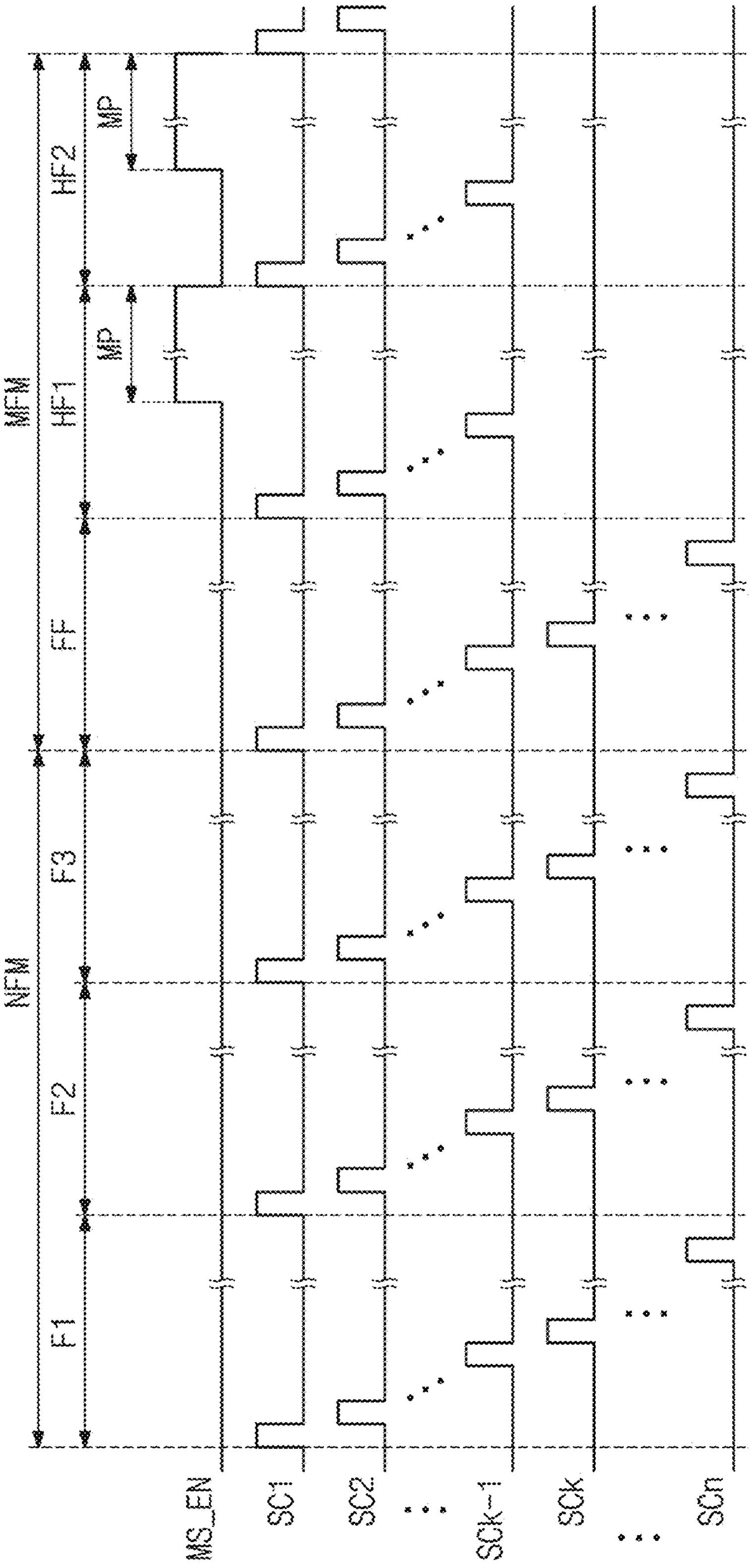
FIG. 6B is a waveform diagram illustrating scan signals output from a first scan driver in a normal frequency mode and multi-frequency mode.

FIG. 6A is a block diagram of a first scan driver, according to an embodiment of the disclosure. FIG. 6B is a waveform diagram illustrating scan signals output from a first scan driver in a normal frequency mode and multi-frequency mode.

Referring to FIG. 6A, the first scan driver 310 includes driving stages ST1 to STn.

Each of the driving stages ST1 to STn receives the first scan control signal SCS1 from the driving controller 100 illustrated in FIG. 3. In an embodiment, as shown in FIG. 6A, the first scan control signal SCS1 includes a start signal FLM, a first clock signal CLK1, a second clock signal CLK2, and a masking enable signal MS_EN. Each of the driving stages ST1 to STn receives a first voltage VGL and a second voltage VGH. The first voltage VGL and the second voltage VGH may be provided from the voltage generator 400 illustrated in FIG. 3.

The masking enable signal MS_EN is a signal for driving some of the driving stages ST1 to STn at a normal frequency and driving the others thereof at a low frequency lower than the normal frequency. The masking enable signal MS_EN may be provided in common to all the driving stages ST1 to STn in the first scan driving circuit SD1.

In an embodiment, the driving stages ST1 to STn output scan signals SC1 to SCn, respectively. The scan signals SC1 to SCn may be compensation scan signals provided to the compensation scan lines SCL1 to SCLn shown in FIG. 3.

The driving stage ST1 may receive the start signal FLM as a carry signal. Each of the driving stages ST1 to STn has a dependent (or cascaded) connection relationship that allows a scan signal output from the previous driving stage to be received as a carry signal. A compensation scan signal output from a k-th driving stage among the driving stages ST1 to STn may be provided as a carry signal of a (k+h)-th driving stage. Here, each of 'k' and 'h' is an integer greater than or equal to 1. In an embodiment, for example, the driving stage ST2 receives the compensation scan signal SC1 output from the previous driving stage ST1 as a carry signal, and the driving stage ST3 receives the compensation scan signal SC2 output from the previous driving stage ST2 as a carry signal. FIG. 6A illustrates an embodiment where the k-th driving stage receives a compensation scan signal from the (k−1)-th driving stage as a carry signal, but the disclosure is not limited thereto.

FIG. 6B is a diagram illustrating compensation the scan signals SC1 to SCn output from the first scan driver 310 shown in FIG. 6A in a normal frequency mode and multi-frequency mode.

Referring to FIGS. 6A and 6B, the masking enable signal MS_EN is deactivated in the normal frequency mode NFM. In the normal frequency mode NFM, the driving stages ST1 to STn sequentially output the compensation the scan signals SC1 to SCn to be in high levels during each of frames F1, F2, and F3.

In the multi-frequency mode MFM, the masking enable signal MS_EN may be deactivated during a full frame FF. Afterward, when partial frames HF1 and HF2 are started, the masking enable signal MS_EN may be activated during a predetermined period (e.g., a masking period MP) of each of the partial frames HF1 and HF2. In an embodiment, for example, the masking enable signal MS_EN may be changed from a low level to a high level at the start time of the masking period MP.

During each of the partial frame HF1 and HF2, some of the compensation scan signals SC1 to SCk−1 may be sequentially driven to be in a high level during a period (i.e., a non-masking period) in which the masking enable signal MS_EN is maintained at a low level. When the masking enable signal MS_EN is changed from a low level to a high level at the start time of the masking period MP, the other compensation scan signals SCk to SCn may be maintained at a low level.

Figure 7:
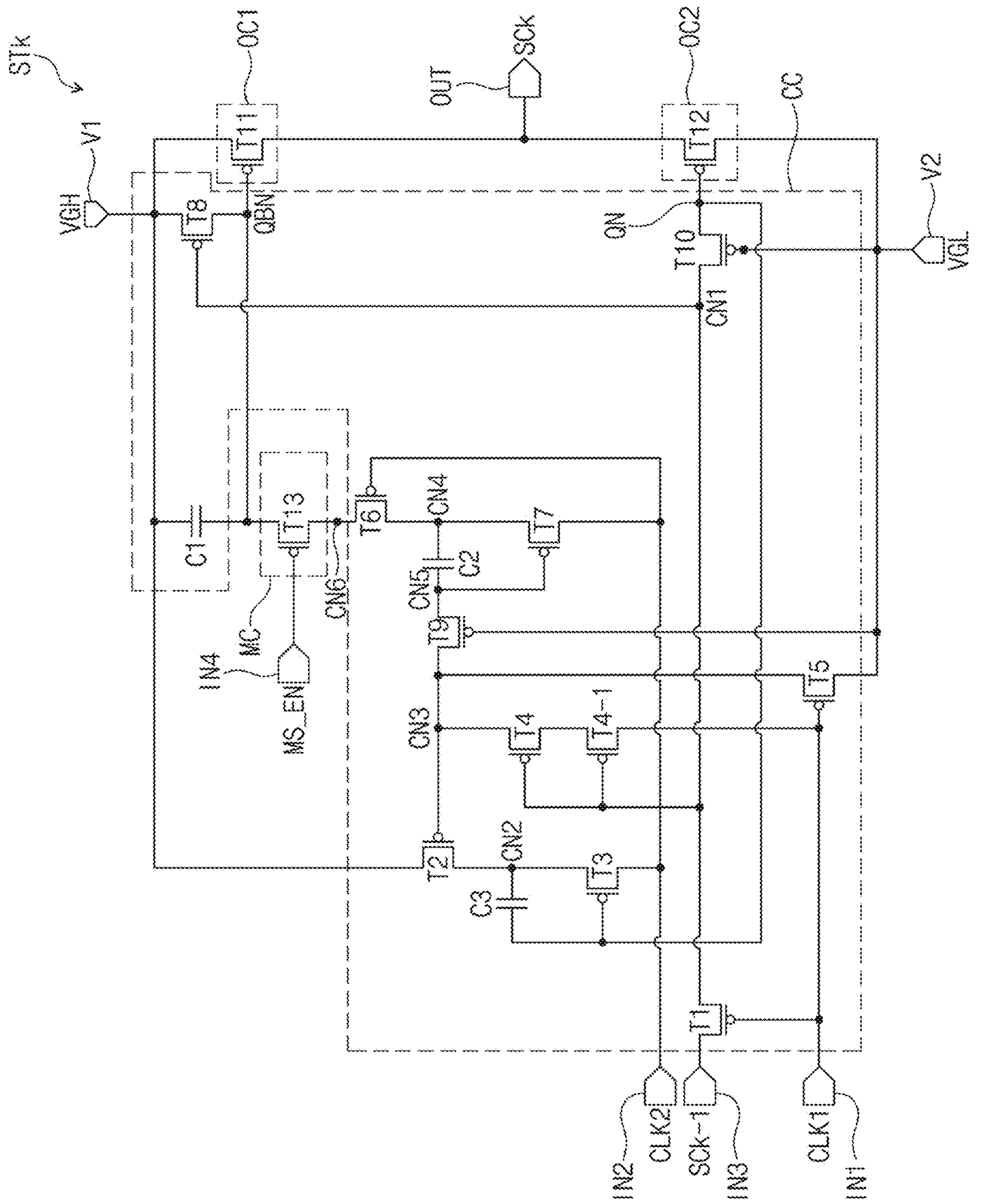
FIG. 7 is a circuit diagram illustrating a k-th driving stage STk of a first scan driver, according to an embodiment of the disclosure.
Figure 8A:
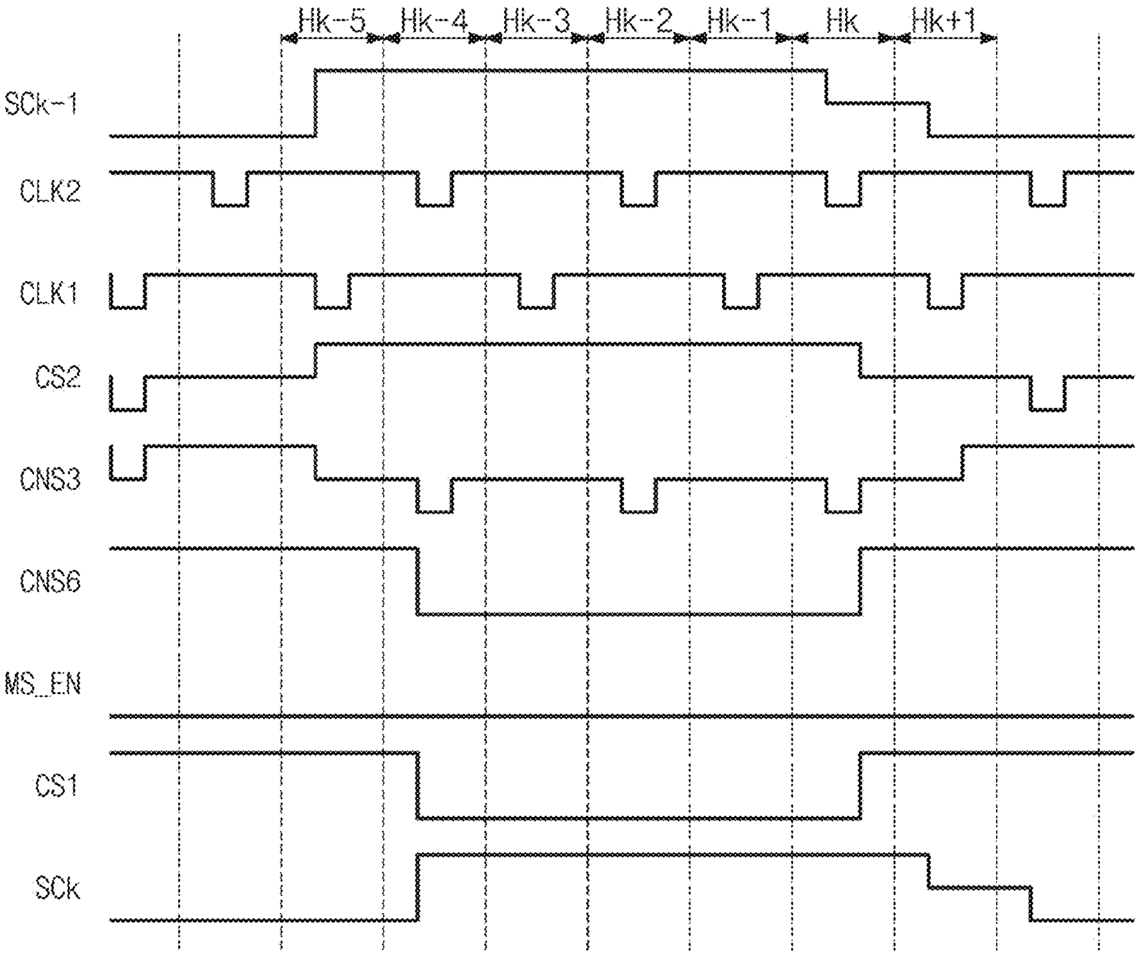
FIG. 8A is a waveform diagram for describing an operation of a k-th driving stage in a normal frequency mode.
Figure 8B:
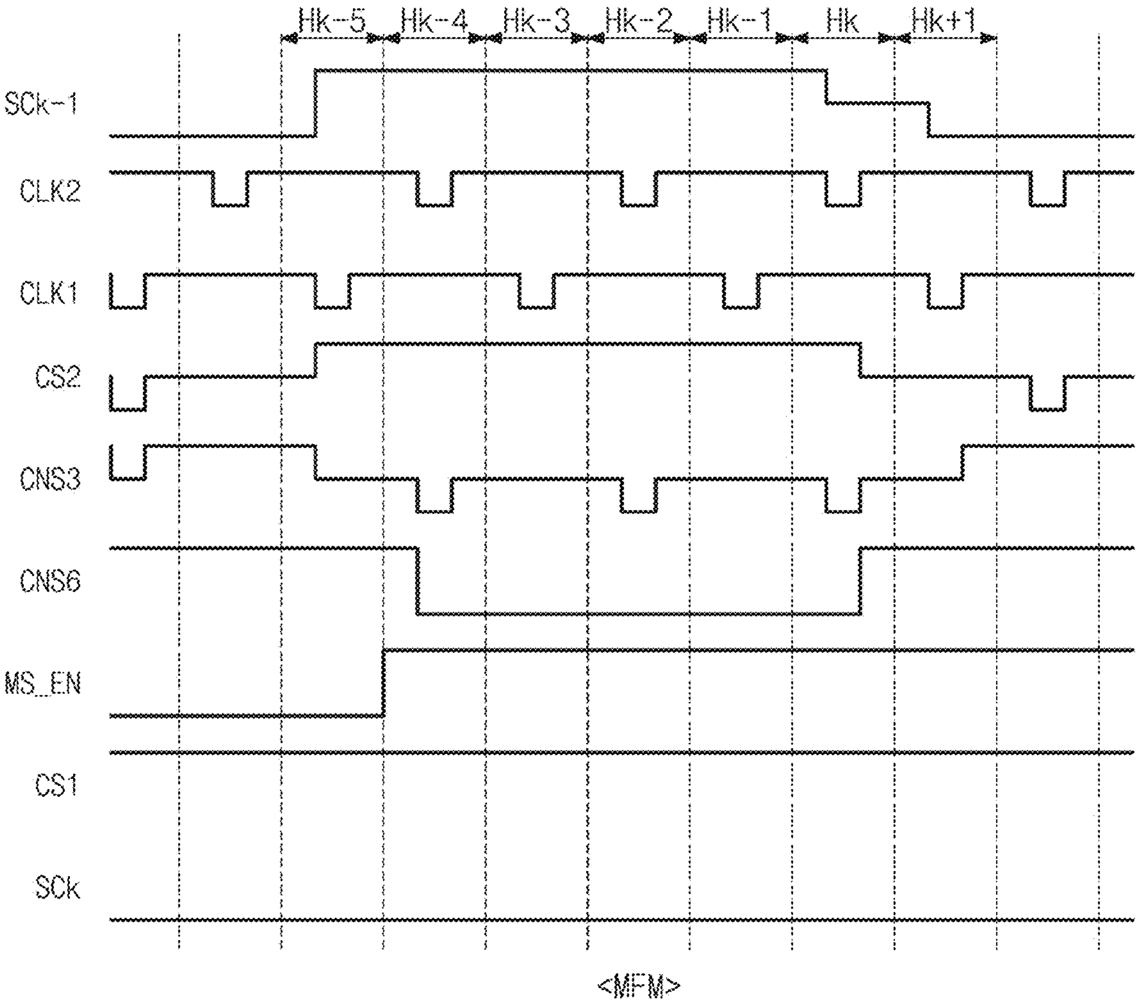
FIG. 8B is a waveform diagram for describing an operation of a k-th driving stage in a multi-frequency mode.

FIG. 7 is a circuit diagram illustrating a k-th driving stage STk of a first scan driver, according to an embodiment of the disclosure. FIG. 8A is a waveform diagram for describing an operation of a k-th driving stage in a normal frequency mode. FIG. 8B is a waveform diagram for describing an operation of a k-th driving stage in a multi-frequency mode. Each of the driving stages ST1 to STn shown in FIG. 6A has a same circuit configuration as that of the k-th driving stage STk shown in FIG. 7, and thus the driving stage STk will be described in detail and any repetitive detailed description associated with the other driving stages will be omitted. Hereinafter, for convenience of description, the k-th driving stage STk is referred to as the "driving stage STk".

Referring to FIG. 7, the driving stage STk includes a control unit CC, a first output unit OC1, a second output unit OC2, and a masking control unit MC. The driving stage STk further includes first to fourth input terminals IN1, IN2, IN3, and IN4, first and second voltage terminals V1 and V2, and an output terminal OUT. The driving stage STk outputs a k-th compensation scan signal SCk through the output terminal OUT. In an embodiment of the disclosure, a first voltage VGH is applied to the first voltage terminal V1, and a second voltage VGL is applied to the second voltage terminal V2. Herein, the second voltage VGL may have a lower voltage level than the first voltage VGH. Accordingly, during an activation section, the k-th compensation scan signal SCk (hereinafter referred to as the "compensation scan signal SCk") may have a same voltage level as the first voltage VGH. During a non-activation section, the k-th compensation scan signal SCk may have a same level as the second voltage VGL.

In response to clock signals CLK1 and CLK2 and a carry signal SCk−1, the control unit CC may output a first control signal CS1 to a first control node QBN and may output a second control signal CS2 to a second control node QN. In an embodiment of the disclosure, the clock signals CLK1 and CLK2 may be the first clock signal CLK1 and the second clock signal CLK2, respectively. The control unit CC receives the first clock signal CLK1 through the first input terminal IN1 and receives the second clock signal CLK2 through the second input terminal IN2. However, the disclosure is not limited thereto.

The first input terminal IN1 of each of some driving stages (e.g., odd-numbered driving stages) among the driving stages ST1 to STn illustrated in FIG. 6A may receive the first clock signal CLK1, and the second input terminals IN2 thereof may receive the second clock signal CLK2. In such an embodiment, the first input terminal IN1 of each of some driving stages (e.g., even-numbered driving stages) among the driving stages ST1 to STn receives the second clock signal CLK2, and the second input terminals IN2 thereof receives the first clock signal CLK1.

The control unit CC receives the carry signal SCk−1 through the third input terminal IN3. In an embodiment of the disclosure, the carry signal SCk−1 may be a (k−1)-th compensation scan signal SCk−1 output through the output terminal OUT of the previous driving stage (i.e., the (k−1)-th driving stage), but the disclosure is not particularly limited thereto. The driving stage ST1 illustrated in FIG. 6A may receive the start signal FLM as a carry signal.

The control unit CC is connected to the first voltage terminal V1, to which the first voltage VGH is supplied, and the second voltage terminal V2 to which the second voltage VGL is supplied.

The first output unit OC1 is connected to the first control node QBN, the output terminal OUT, and the first voltage terminal V1, and operates in response to the first control signal CS1. The second output unit OC2 is connected to the second control node QN, the output terminal OUT, and the second voltage terminal V2, and operates in response to the second control signal CS2.

The control unit CC includes control transistors T1 to T10 and control capacitors C1, C2, and C3. In the control unit CC, the first control transistor T1 is connected between a third input terminal IN3 and a first node CN1 and includes a gate electrode connected to the first input terminal IN1. The second control transistor T2 is connected between the first voltage terminal V1 and a second node CN2, and includes a gate electrode connected to a third node CN3. The third control transistor T3 is connected between the second node CN2 and the second input terminal IN2, and includes a gate electrode connected to the second control node QN.

The fourth control transistors T4 and T4-1 are connected between the third node CN3 and the first input terminal IN1, and include gate electrodes connected to the first node CN1. In an embodiment of the disclosure, the plurality of fourth control transistors T4 and T4-1 may be provided, and the plurality of fourth transistors T4 and T4-1 may be connected in series between the third node CN3 and the first input terminal IN1. The fifth control transistor T5 is connected between the third node CN3 and the second voltage terminal V2, and includes a gate electrode connected to the first input terminal IN1. The sixth control transistor T6 is connected between a fourth node CN4 and a masking node CN6 and includes a gate electrode connected to the second input terminal IN2. The seventh control transistor T7 is connected between the fourth node CN4 and the second input terminal IN2, and includes a gate electrode connected to a fifth node CN5.

The first control capacitor C1 is connected between the first control node QBN and the first voltage terminal V1. The second control capacitor C2 is connected between the fourth node CN4 and the fifth node CN5. The third control capacitor C3 is connected between the second node CN2 and the second control node QN.

The eighth control transistor T8 is connected between the first voltage terminal V1 and the first control node QBN, and includes a gate electrode connected to the first node CN1. The ninth control transistor T9 is connected between the third node CN3 and the fifth node CN5, and includes a gate electrode connected to the second voltage terminal V2. The tenth control transistor T10 is connected between the first node CN1 and the second control node QN, and includes a gate electrode connected to the second voltage terminal V2.

In response to the carry signal SCk−1 and first and second clock signals CLK1 and CLK2, the control unit CC outputs the first control signal CS1 for controlling the first output unit OC1 to the first control node QBN and outputs the second control signal CS2 for controlling the second output unit OC2 to the second control node QN. FIG. 7 illustrates an embodiment having a structure in which the control unit CC includes the ten control transistors T1 to T10 and the three control capacitors C1, C2, and C3, but a circuit configuration of the control unit CC is not limited thereto. That is, the number and connection relationship of control transistors and control capacitors included in the control unit CC may be variously modified.

The first output unit OC1 includes a first output transistor T11, and the second output unit OC2 includes a second output transistor T12. The first output transistor T11 is connected between the first voltage terminal V1 and the output terminal OUT, and includes a gate electrode connected to the first control node QBN. The second output transistor T12 is connected between the second voltage terminal V2 and the output terminal OUT, and includes a gate electrode connected to the second control node QN.

The masking control unit MC is connected between the second input terminal IN2, to which the second clock signal CLK2 is input, and the first control node QBN, and controls a voltage level (i.e., the potential of the first control node QBN) of the first control signal CS1 in response to the masking enable signal MS_EN. In an embodiment of the disclosure, the masking control unit MC includes or is defined by a single transistor, i.e., a masking transistor T13. The masking transistor T13 is connected between the first control node QBN and the masking node CN6 and includes a gate electrode connected to the fourth input terminal IN4 to which the masking enable signal MS_EN is supplied.

Referring to FIGS. 7 and 8A, when the first clock signal CLK1 is at a low level in a (k−5)-th horizontal section Hk−5, the first control transistor T1 is turned on. As the first control transistor T1 is turned on, the potential (i.e., a first node signal) of the first node CN1 and the potential (i.e., the second control signal CS2) of the second control node QN increase to a high level based on a voltage level of the carry signal SCk−1. When the first clock signal CLK1 is at the low level, the fifth control transistor T5 is turned on, and thus the potential (i.e., a third node signal CNS3) of the third node CN3 and the potential of the fifth node CN5 are discharged to the second voltage VGL. In the (k−5)-th horizontal section Hk−5, as the potential (i.e., the first node signal) of the first node CN1 rises to a high level, the eighth control transistor T8 is turned off.

When the second clock signal CLK2 transitions to a low level in a (k−4)-th horizontal section Hk−4, the sixth control transistor T6 is turned on, and thus the potential (i.e., the masking control signal CNS6) of the masking node CN6 is discharged to the potential of the second input terminal IN2 through the sixth and seventh control transistors T6 and T7. The masking enable signal MS_EN is maintained at a low level (i.e., an active state) in the normal frequency mode NFM, the masking transistor T13 is turned on in the normal frequency mode NFM. When the masking transistor T13 is turned on during the activation section of the masking enable signal MS_EN, the masking node CN6 is electrically connected to the first control node QBN. Accordingly, the potential (i.e., the first control signal CS1) of the first control node QBN may be transitioned to a low level through the sixth and seventh control transistors T6 and T7.

As the potential (i.e., the first control signal CS1) of the first control node QBN transitions to a low level, the first output transistor T11 may be turned on, and thus the first voltage VGH may be output as the compensation scan signal SCk through the output terminal OUT. During (k−3)-th to (k−1)-th horizontal sections Hk−3, Hk−2, and Hk−1, the compensation scan signal SCk may maintain a high level (i.e., a level of the first voltage VGH).

When the first clock signal CLK1 is at a low level in the (k+1)-th horizontal section Hk+1 after the carry signal SCk−1 transitions from a high level to a low level in the k-th horizontal section Hk, the first control transistor T1 is turned on. Accordingly, the potential of the first node CN1 and the potential (i.e., the second control signal CS2) of the second control node QN are lowered to the voltage level of the carry signal SCk−1. As the second output transistor T12 is turned on in response to the low level of the potential (i.e., the second control signal CS2) of the second control node QN, the second voltage VGL may be output as the compensation scan signal SCk.

Referring to FIGS. 6B, 7, and 8B, at the start time of the masking period MP of each of the partial frames HF1 and HF2 in the multi-frequency mode MFM, the masking enable signal MS_EN is changed from a low level to a high level. Here, a low level section of the masking enable signal MS_EN is defined as an activation section, and a high level section thereof is defined as a non-activation section.

When the second clock signal CLK2 transitions to a low level in the (k−4)-th horizontal section Hk−4, the potential (i.e., a masking control signal CNS6) of the masking node CN6 is discharged to the potential of the second input terminal IN2 through the sixth and seventh control transistors T6 and T7. When the masking enable signal MS_EN is changed to a high level (i.e., during the non-activation section of the masking enable signal MS_EN), the masking transistor T13 is turned off. When the masking transistor T13 is turned off, the masking node CN6 is electrically isolated from the first control node QBN. Accordingly, the potential (i.e., the first control signal CS1) of the first control node QBN may not be transitioned to a low level through the sixth and seventh control transistors T6 and T7, and may be maintained at a high level.

As the potential (i.e., the first control signal CS1) of the first control node QBN transitions to a high level, the first output transistor T11 may be turned off, and thus the first voltage VGH may not be output as a compensation scan signal SCk through the output terminal OUT. That is, during the masking period MP, the compensation scan signal SCk may maintain a low level (i.e., the level of the second voltage VGL). Accordingly, the first scan driver 310 (see FIG. 6A) may mask the k-th to n-th compensation scan signals SCk to SCn not to be activated during each of the partial frames HF1 and HF2.

In an embodiment, as described above, the masking control unit MC for masking k-th to n-th compensation scan signals SCk to SCn not to be activated during each of the partial frames HF1 and HF2 is implemented with only a single masking transistor T13, thereby minimizing an increase in the size of each of the driving stages ST1 to STn due to the masking control unit MC. Accordingly, the size (or width) of the non-display area NDA may be prevented from being increased due to the first scan driver 310 in the display device DD (see FIG. 3).

Figure 9:
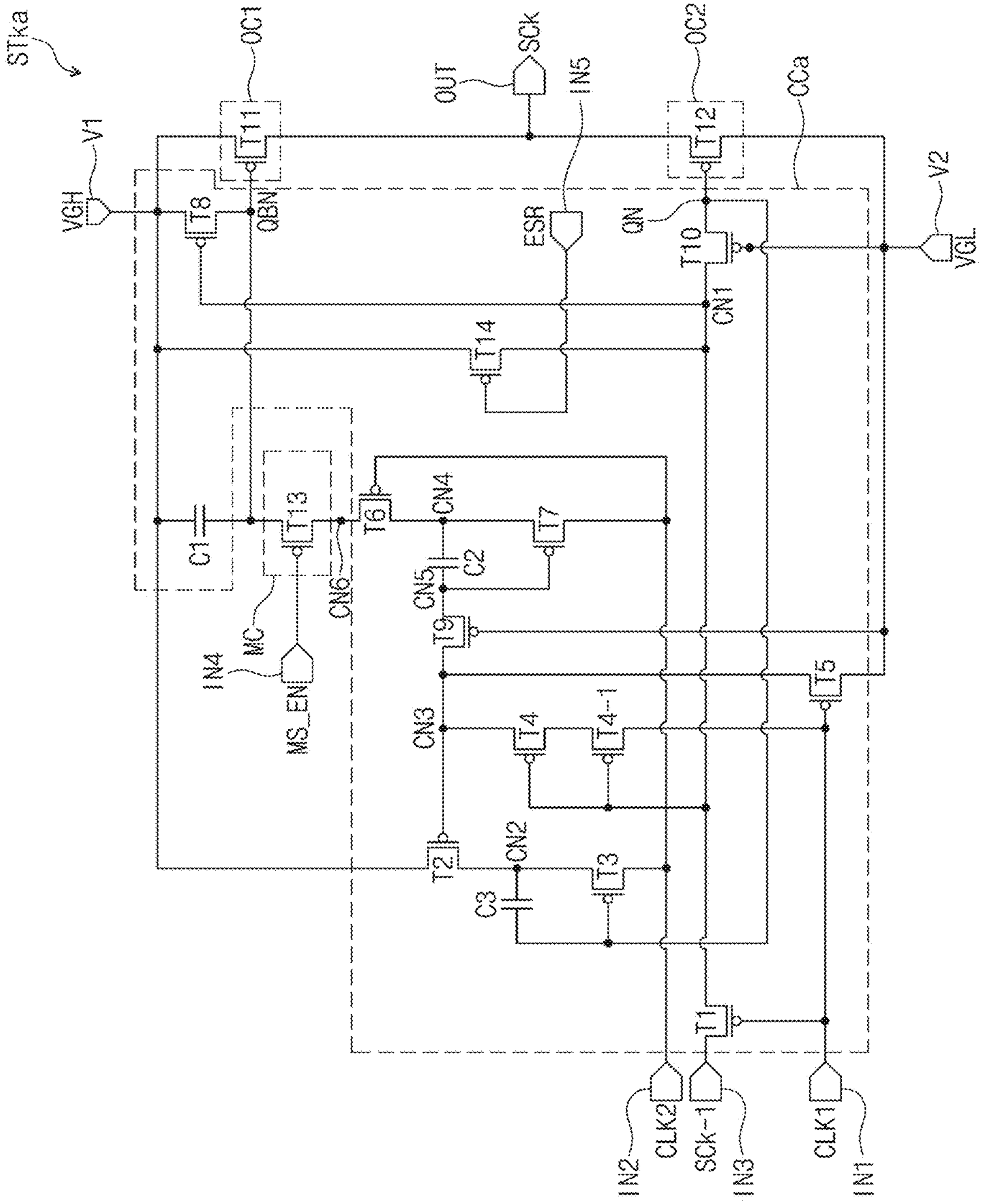
FIG. 9 is a circuit diagram illustrating a k-th driving stage STka of a first scan driver, according to an alternative embodiment of the disclosure.

FIG. 9 is a circuit diagram illustrating a k-th driving stage STka of a first scan driver, according to an alternative embodiment of the disclosure. The same reference numerals are given to the same components as those shown in FIG. 7 among the components shown in FIG. 9, and thus any repetitive detailed description thereof will be omitted to avoid redundancy.

Referring to FIG. 9, the driving stage STk includes a control unit CCa, a first output unit OC1, a second output unit OC2, and a masking control unit MC. The driving stage STk further includes first to fifth input terminals IN1, IN2, IN3, IN4, and IN5, first and second voltage terminals V1 and V2, and an output terminal OUT. The control unit CCa may receive a power-on control signal ESR through the fifth input terminal IN5.

The control unit CCa includes control transistors T1 to T10, a dummy transistor T14, and control capacitors C1, C2, and C3.

The dummy transistor T14 is connected between the first voltage terminal V1 and the first node CN1, and includes a gate electrode connected to the fifth input terminal IN5. The power-on control signal ESR may be activated in a power-on section in which power is started to be supplied to the display device DD (see FIG. 3). That is, the power-on control signal ESR may have a low level during the power-on section and may have a high level during a normal section afterward. Accordingly, the dummy transistor T14 may be turned on in response to the low level of the power-on control signal ESR. The first voltage VGH may be applied to the first node CN1 and the second control node QN through the dummy transistor T14 turned on during the power-on section, thereby preventing the second output transistor T12 from being turned on.

Figure 10:
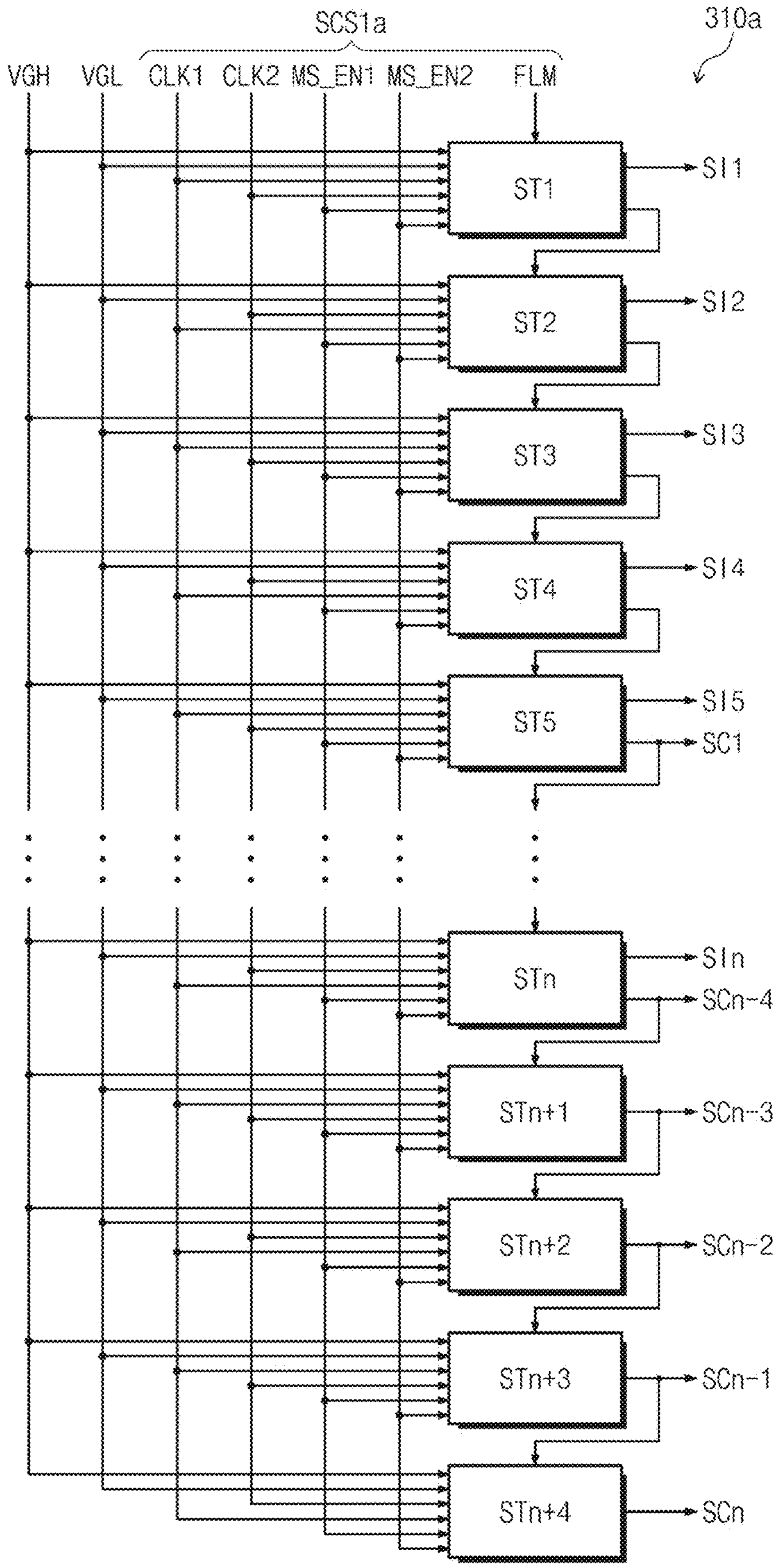
FIG. 10 is a block diagram of a first scan driver, according to an alternative embodiment of the disclosure.

FIG. 10 is a block diagram of a first scan driver, according to an alternative embodiment of the disclosure.

Referring to FIG. 10, an embodiment of a first scan driver 310*a* includes a plurality of driving stages ST1 to STn+4.

Each of the driving stages ST1 to STn+4 receives a first scan control signal SCS1a from the driving controller 100 illustrated in FIG. 3. The first scan control signal SCS1a includes the start signal FLM, the first clock signal CLK1, the second clock signal CLK2, a first masking enable signal MS_EN1 and a second masking enable signal MS_EN2. Each of the driving stages ST1 to STn+4 receives a first voltage VGL and a second voltage VGH. The first voltage VGL and the second voltage VGH may be provided from the voltage generator 400 illustrated in FIG. 3.

The first masking enable signal MS_EN1 and the second masking enable signal MS_EN2 are signals for driving some of the driving stages ST1 to STn+4 at a normal frequency and driving the others thereof at a low frequency lower than the normal frequency.

In an embodiment, the driving stages ST1 to STn+4 output initialization scan signals SI1 to SIn (or first scan signals) and compensation the scan signals SC1 to SCn (or second scan signals). The initialization scan signals SI1 to SIn may be provided to the initialization scan lines SIL1 to SILn shown in FIG. 3, and the compensation the scan signals SC1 to SCn may be provided to the compensation scan lines SCL1 to SCLn illustrated in FIG. 3.

The driving stage ST1 may receive the start signal FLM as a carry signal. Each of the driving stages ST1 to STn+4 has a dependent (or cascaded) connection relationship that allows a second scan signal output from the previous driving stage to be received as a carry signal. In an embodiment, for example, the driving stage ST2 receives the compensation scan signal SC1 output from the previous driving stage ST1 as a carry signal, and the driving stage ST3 receives the compensation scan signal SC2 output from the previous driving stage ST2 as a carry signal.

Figure 11:
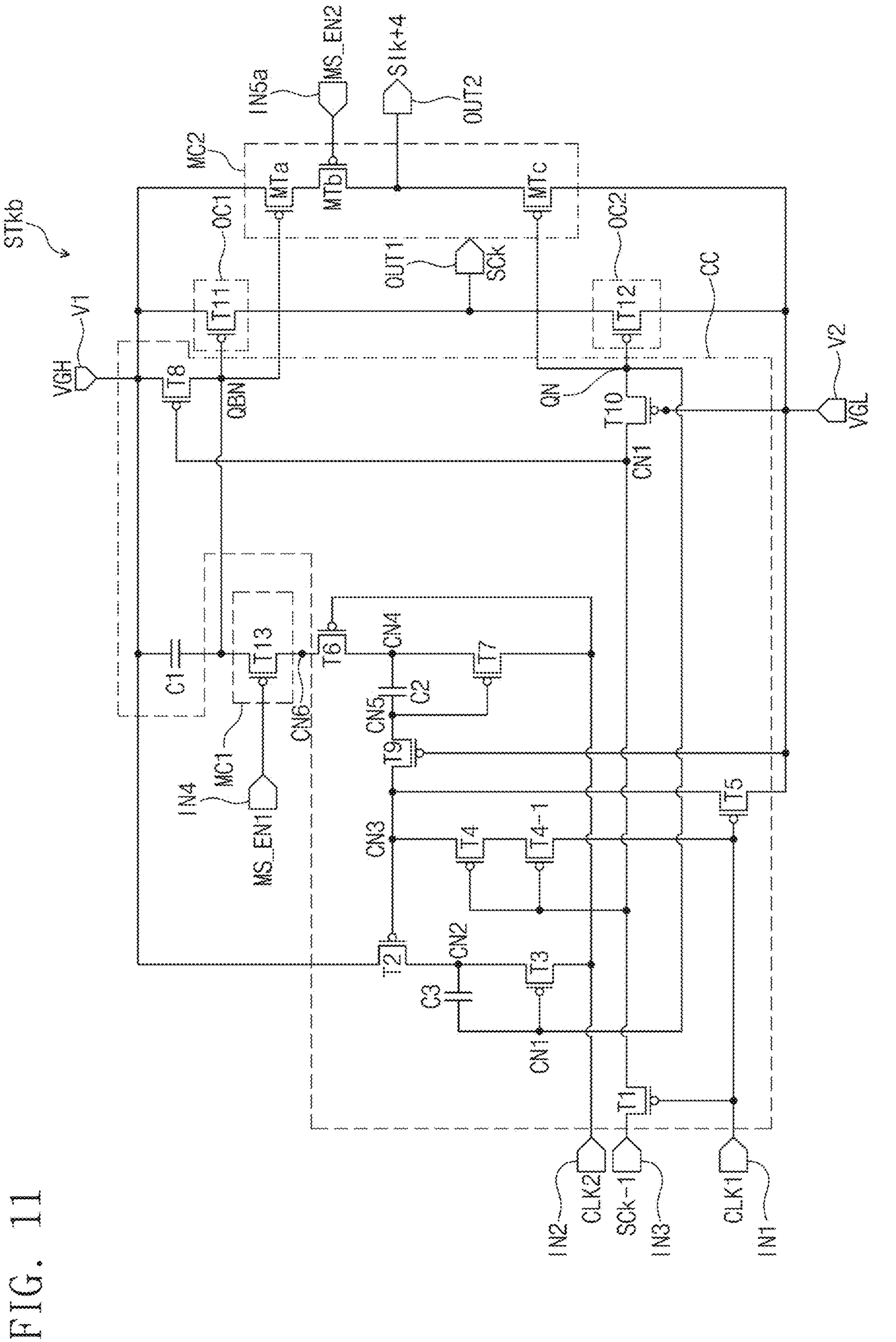
FIG. 11 is a circuit diagram illustrating a k-th driving stage STkb of a first scan driver, according to an alternative embodiment of the disclosure.
Figure 12A:
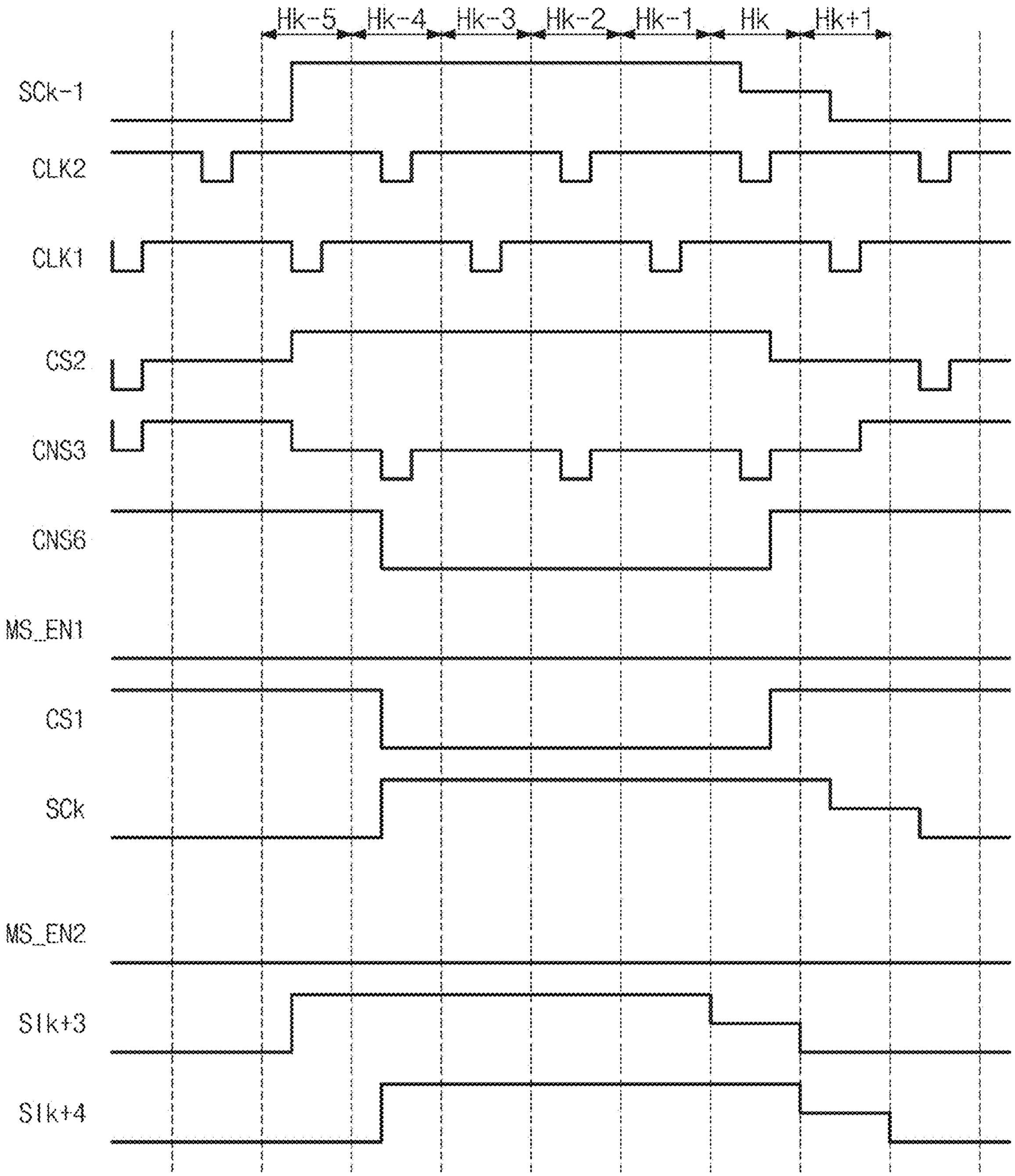
FIG. 12A is a waveform diagram for describing an operation of a k-th driving stage in a normal frequency mode.
Figure 12B:
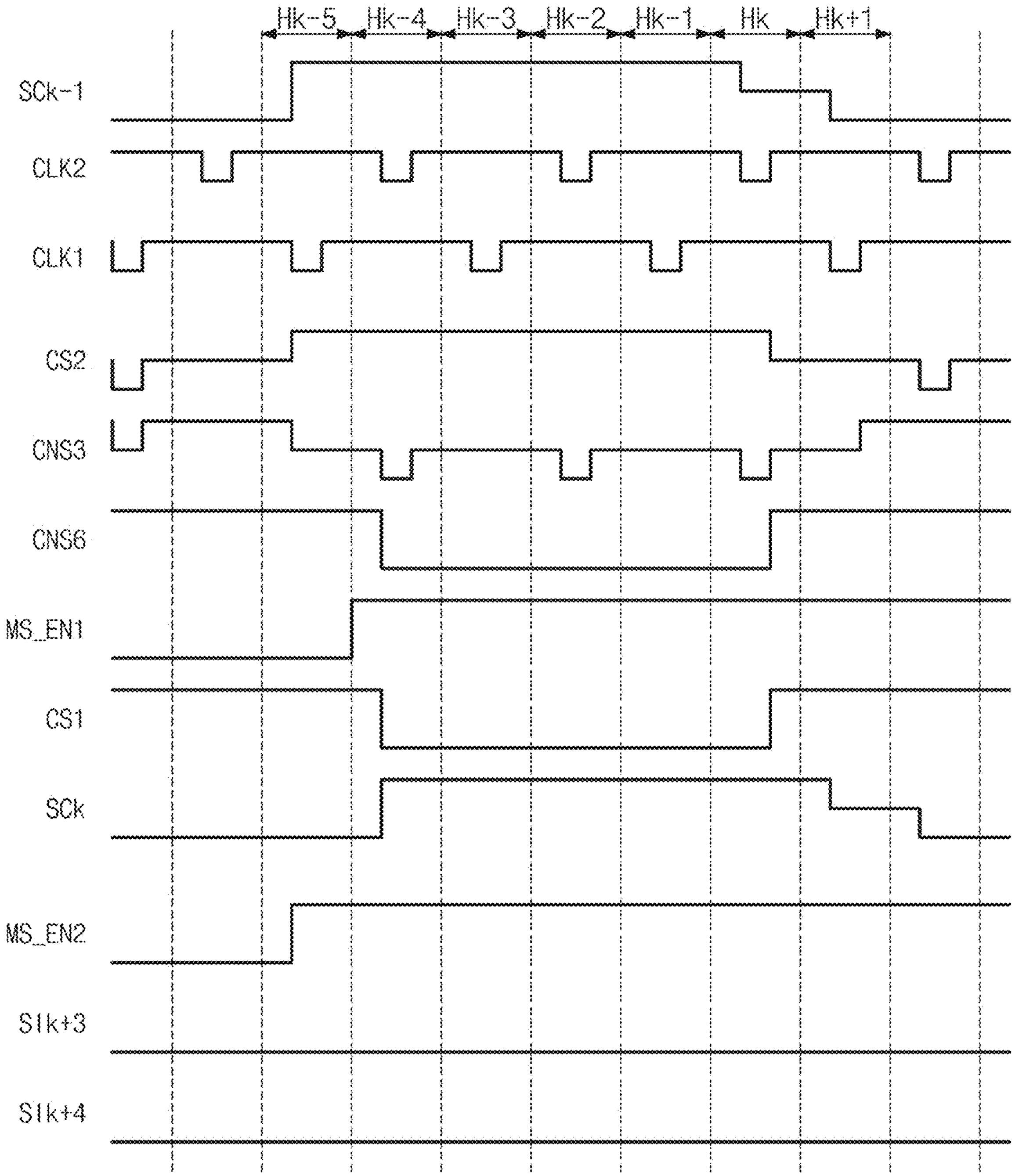
FIG. 12B is a waveform diagram for describing an operation of a k-th driving stage in a multi-frequency mode.

FIG. 11 is a circuit diagram illustrating a k-th driving stage STkb of a first scan driver, according to an alternative embodiment of the disclosure. FIG. 12A is a waveform diagram for describing an operation of a k-th driving stage in a normal frequency mode. FIG. 12B is a waveform diagram for describing an operation of a k-th driving stage in a multi-frequency mode. The same reference numerals are given to the same components as those shown in FIG. 7 among the components shown in FIG. 11, and thus any repetitive detailed description thereof will be omitted to avoid redundancy.

Referring to FIG. 11, the driving stage STkb includes the control unit CC, the first output unit OC1, the second output unit OC2, a first masking control unit MC1 and a second masking control unit MC2. The driving stage STkb further includes first to fifth input terminals IN1, IN2, IN3, IN4, and IN5a, first and second voltage terminals V1 and V2, and first and second output terminals OUT1 and OUT2. The driving stage STkb outputs the k-th the compensation scan signal SCk through the first output terminal OUT1 and outputs the (k−4)-th initialization scan signal SIk−4 through the second output terminal OUT2.

The control unit CC, the first and second output units OC1 and OC2 have a same circuit configuration as the control unit CC, the first and second output units OC1 and OC2 shown in FIG. 7.

The first masking control unit MC1 is connected between the second input terminal IN2, to which the second clock signal CLK2 is input, and the first control node QBN, and controls a voltage level (i.e., the potential of the first control node QBN) of the first control signal CS1 in response to a first masking enable signal MS_EN1. The first masking control unit MC1 includes the first masking transistor T13. The first the masking transistor T13 is connected between the first control node QBN and the masking node CN6 and includes a gate electrode connected to the fourth input terminal IN4 to which a first masking enable signal MS_EN1 is supplied.

The second masking control unit MC2 is connected to the first and second control nodes QBN and QN, and controls the voltage level of the initialization scan signal SIk+4 to be output to the second output terminal OUT2 in response to the second masking enable signal MS_EN2. In an embodiment of the disclosure, the second masking control unit MC2 includes a second masking transistor MTa, a third masking transistor MTb, and a fourth masking transistor MTc. The second masking transistor MTa is connected between the first voltage terminal V1 and the third masking transistor MTb, and includes a gate electrode connected to the first control node QBN. The third masking transistor MTb is connected between the second masking transistor MTa and the second output terminal OUT2, and includes a gate electrode connected to the fifth input terminal IN5a to which a second masking enable signal MS_EN2 is supplied. The fourth masking transistor MTc is connected between the second voltage terminal V2 and the second output terminal OUT2, and includes a gate electrode connected to the second control node QN. FIG. 11 illustrates an embodiment of the second masking control unit MC2, but a circuit configuration of the second masking control unit MC2 is not limited thereto.

Referring to FIGS. 11 and 12A, in the normal frequency mode NFM, when the first clock signal CLK1 is at a low level in a (k−5)-th horizontal section Hk−5, the first control transistor T1 is turned on. As the first control transistor T1 is turned on, the potential (i.e., a first node signal) of the first node CN1 and the potential (i.e., the second control signal CS2) of the second control node QN increase to a high level depending on a voltage level of the carry signal SCk−1. When the first clock signal CLK1 is at the low level, the fifth control transistor T5 is turned on, and thus the potential (i.e., a third node signal CNS3) of the third node CN3 and the potential of the fifth node CN5 are discharged to the second voltage VGL. In the (k−5)-th horizontal section Hk−5, as the potential (i.e., the first node signal) of the first node CN1 rises to a high level, the eighth control transistor T8 is turned off.

When the second clock signal CLK2 transitions to a low level in a (k−4)-th horizontal section Hk−4, the sixth control transistor T6 is turned on, and thus the potential (i.e., the masking control signal CNS6) of the masking node CN6 is discharged to the potential of the second input terminal IN2 through the sixth and seventh control transistors T6 and T7. The first masking enable signal MS_EN1 is maintained at a low level in the normal frequency mode NFM, the masking transistor T13 is turned on in the normal frequency mode NFM. When the masking transistor T13 is turned on, the masking node CN6 is electrically connected to the first control node QBN. Accordingly, the potential (i.e., the first control signal CS1) of the first control node QBN may be transitioned to a low level through the sixth and seventh control transistors T6 and T7.

As the potential (i.e., the first control signal CS1) of the first control node QBN transitions to a low level, the first output transistor T11 may be turned on, and thus the first voltage VGH may be output as the compensation scan signal SCk through the first output terminal OUT1. During (k−3)-th to (k−1)-th horizontal sections Hk−3, Hk−2, and Hk−1, the compensation scan signal SCk may maintain a high level (i.e., a level of the first voltage VGH).

In the normal frequency mode NFM, the second masking enable signal MS_EN2 may be maintained at a low level. Accordingly, in the normal frequency mode NFM, the third masking transistor MTb may be turned on in response to the second masking enable signal MS_EN2 having the low level. As the potential (i.e., the first control signal CS1) of the first control node QBN transitions to a low level, the second masking transistor MTa is turned on. Accordingly, the first voltage VGH may be output to the second output terminal OUT2 as the initialization scan signal SCk+4 through the second and third masking transistors MTa and MTb thus turned-on.

When the first clock signal CLK1 is at a low level in the (k+1)-th horizontal section Hk+1 after the carry signal SCk−1 transitions from a high level to a low level in the k-th horizontal section Hk, the first control transistor T1 is turned on. Accordingly, the potential of the first node CN1 and the potential (i.e., the second control signal CS2) of the second control node QN are lowered to the voltage level of the carry signal SCk−1. As the second output transistor T12 is turned on in response to the low level of the potential (i.e., the second control signal CS2) of the second control node QN, the second voltage VGL may be output as the compensation scan signal SCk to the first output terminal OUT1. As the potential (i.e., the second control signal CS2) of the second control node QN transitions to a low level, the fourth masking transistor MTc is turned on. Accordingly, the second voltage VGL may be output to the second output terminal OUT2 as the initialization scan signal SCk+4 through the fourth masking transistor MTc thus turned-on.

That is, in the normal frequency mode NFM, the initialization scan signal SCk+4 may have a same waveform as the compensation scan signal SCk.

Referring to FIGS. 6B, 11, and 12B, at the start (e.g., the start time of the (k−4)-th horizontal section Hk−4) of the masking period MP of each of the partial frames HF1 and HF2 in the multi-frequency mode MFM, the first masking enable signal MS_EN1 is changed from a low level to a high level.

When the second clock signal CLK2 transitions to a low level during the (k−4)-th horizontal section Hk−4 in the multi-frequency mode MFM, the potential (i.e., a masking control signal CNS6) of the masking node CN6 is discharged to the potential of the second input terminal IN2 through the sixth and seventh control transistors T6 and T7. When the first masking enable signal MS_EN1 is changed to a high level, the first masking transistor T13 is turned off. When the first masking transistor T13 is turned off, the masking node CN6 is electrically isolated from the first control node QBN. Accordingly, the potential (i.e., the first control signal CS1) of the first control node QBN may not be transitioned to a low level through the sixth and seventh control transistors T6 and T7, and may be maintained at a high level.

As the potential (i.e., the first control signal CS1) of the first control node QBN transitions to a high level, the first output transistor T11 may be turned off, and thus the first voltage VGH may not be output as a compensation scan signal SCk through the output terminal OUT. That is, during the masking period MP, the compensation scan signal SCk may maintain a low level (i.e., the level of the second voltage VGL). Accordingly, the first scan driver 310 (see FIG. 6A) may mask the k-th to n-th compensation scan signals SCk to SCn not to be activated during each of the partial frames HF1 and HF2.

The second masking enable signal MS_EN2 is changed from a low level to a high level at a point in time (e.g., the start time of the (k−5)-th horizontal section Hk−5) before the start time of the masking period MP. When the second masking enable signal MS_EN2 is changed to a high level in the multi-frequency mode MFM, the third masking transistor MTb may be turned off in response to the second masking enable signal MS_EN2 having a high level. Accordingly, even though the second masking transistor MTa is turned on as the potential (i.e., the first control signal CS1) of the first control node QBN transitions to a low level, the first voltage VGH may not be output to the second output terminal OUT2 by the third masking transistor MTb thus turned-off. That is, during the masking period MP, the initialization scan signals SCk+3 and SCk+4 may maintain a low level (i.e., the level of the second voltage VGL). Accordingly, the first scan driver 310 (see FIG. 6A) may mask the k-th to n-th compensation scan signals SCk to SCn not to be activated during each of the partial frames HF1 and HF2.

According to embodiments of the disclosure, a masking control unit provided in each driving stage is implemented with one masking transistor to operate a first scan driver in a multi-frequency mode, such that an increase in a size of each driving stage due to the masking control unit may be minimized. Accordingly, it is possible to prevent a size (or width) of a non-display area from increasing due to the masking control unit in a display device.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A scan driver comprising:

a control unit which outputs a first control signal to a first control node and outputs a second control signal to a second control node, in response to clock signals and a carry signal;

a first output unit connected to the first control node, a first output terminal, and a first voltage terminal to which a first voltage is supplied, wherein the first output unit operates in response to the first control signal;

a second output unit connected to the second control node, the first output terminal, and a second voltage terminal to which a second voltage is supplied, wherein the second output unit operates in response to the second control signal; and a first masking control unit connected between an input terminal, to which one clock signal of the clock signals is input, and the first control node, wherein the first masking control unit controls a voltage level of the first control signal in response to a first masking enable signal, wherein the first masking control unit includes a first masking transistor connected between a masking node positioned in the control unit and the first control node and including a gate electrode which receives the first masking enable signal, wherein the control unit includes a control transistor which discharges a potential of the masking node in response to the one clock signal of the clock signals.

2. The scan driver of claim 1, wherein the first masking transistor electrically connects the masking node to the first control node during an activation section of the first masking enable signal and electrically isolates the masking node from the first control node during a non-activation section of the first masking enable signal.

3. The scan driver of claim 2, wherein the scan driver includes a plurality of driving stages, and wherein each of the plurality of driving stages includes a control unit configured same as the control unit, a first output unit configured same as the first output unit, a second output unit configured same as the second output unit, and a first masking unit configured same as the first masking control unit.

4. The scan driver of claim 3, wherein the first masking enable signal is supplied to the plurality of driving stages in common, and wherein the first masking enable signal allows at least two stages of the driving stages to operate at a normal frequency and the remaining stages of the driving stages to operate at a low frequency lower than the normal frequency, in a multi-frequency mode.

5. The scan driver of claim 4, wherein the first masking enable signal is maintained at an active state in a normal frequency mode in which the plurality of driving stages operates at the normal frequency, and wherein the first masking enable signal includes the activation section and the non-activation section in the multi-frequency mode.

6. The scan driver of claim 1, wherein the first output unit includes a first output transistor connected between the first voltage terminal and the first output terminal and including a gate electrode which receives the first control signal, and wherein the second output unit includes a second output transistor connected between the first output terminal and the second voltage terminal and including a gate electrode which receives the second control signal.

7. The scan driver of claim 1, wherein the control unit further includes:

a first control transistor which outputs the carry signal to a first node in response to another clock signal of the clock signals;

a second control transistor which delivers the first voltage to the first control node in response to a potential of the first node; and a first capacitor connected between the first voltage terminal and the first control node.

8. The scan driver of claim 7, wherein the control unit further includes:

a dummy transistor connected between the first voltage terminal and the first node and including a gate electrode which receives a power-on control signal.

9. The scan driver of claim 1, further comprising:

a second masking control unit connected to the first control node and the second control node, wherein the second masking control unit outputs a voltage level of a second scan signal to a second output terminal in response to a second masking enable signal.

10. A display device comprising:

a display panel including a plurality of pixels connected to a plurality of data lines and a plurality of first scan lines;

a data driver which outputs data signals to the plurality of data lines;

a scan driver which outputs first scan signals to the plurality of first scan lines; and a driving controller which controls the data driver and the scan driver, wherein the scan driver includes a plurality of driving stages which output the first scan signals, respectively, and wherein each of the plurality of driving stages includes:

a control unit which outputs a first control signal to a first control node and to output a second control signal to a second control node, in response to clock signals and a carry signal;

a first output unit connected to the first control node, a first output terminal connected to one of the plurality of first scan lines, and a first voltage terminal to which a first voltage is supplied, wherein the first output unit operates in response to the first control signal;

a second output unit connected to the second control node, the first output terminal, and a second voltage terminal to which a second voltage is supplied, wherein the second output unit operates in response to the second control signal; and a first masking control unit connected between an input terminal, to which one clock signal of the clock signals is input, and the first control node, wherein the first masking control unit controls a voltage level of the first control signal in response to a first masking enable signal, wherein the first masking control unit includes a first masking transistor connected between a masking node positioned in the control unit and the first control node and including a gate electrode which receives the first masking enable signal, wherein the control unit includes a control transistor which discharges a potential of the masking node in response to the one clock signal of the clock signals.

11. The display device of claim 10, wherein the first masking transistor electrically connects the masking node to the first control node during an activation section of the first masking enable signal and electrically isolates the masking node from the first control node during a non-activation section of the first masking enable signal.

12. The display device of claim 11, wherein the first masking enable signal is connected to the plurality of driving stages in common, and wherein the first masking enable signal allows at least two stages of the driving stages to operate at a normal frequency and the remaining driving stages to operate at a low frequency lower than the normal frequency, in a multi-frequency mode.

13. The display device of claim 12, wherein the first masking enable signal is maintained at an active state in a normal frequency mode in which the plurality of driving stages operates at the normal frequency, and wherein the first masking enable signal includes the activation section and the non-activation section in the multi-frequency mode.

14. The display device of claim 10, wherein the first output unit includes a first output transistor connected between the first voltage terminal and the first output terminal and including a gate electrode which receives the first control signal, and wherein the second output unit includes a second output transistor connected between the first output terminal and the second voltage terminal and including a gate electrode which receives the second control signal.

15. The display device of claim 10, wherein the control unit further includes:

a first control transistor which outputs the carry signal to a first node in response to another clock signal of the clock signals;

a second control transistor which delivers the first voltage to the first control node in response to a potential of the first node; and a first capacitor connected between the first voltage terminal and the first control node.

16. The display device of claim 15, wherein the control unit further includes:

a dummy transistor connected between the first voltage terminal and the first node and including a gate electrode which receives a power-on control signal.

17. The display device of claim 10, wherein the scan driver further includes a second masking control unit connected to the first control node and the second control node, wherein the second masking control unit outputs a voltage level of a second scan signal to a second output terminal in response to a second masking enable signal.

18. The display device of claim 17, wherein the second masking control unit includes:

a second masking transistor connected between the first voltage terminal and the second output terminal and including a gate electrode which receives a first control signal;

a third masking transistor connected between the second masking transistor and the second output terminal and including a gate electrode which receives the second masking enable signal; and a fourth masking transistor connected between the second voltage terminal and the second output terminal and including a gate electrode which receives the second control signal.

* * * * *